US010820081B1

(12) United States Patent
Belliston et al.

(10) Patent No.: US 10,820,081 B1
(45) Date of Patent: Oct. 27, 2020

(54) SYSTEM AND METHOD FOR SPEAKER MOUNTING

(71) Applicant: SoundVision Technologies, LLC, St. George, UT (US)

(72) Inventors: Brock Belliston, St. George, UT (US); Kary Wawrzyniak, St. George, UT (US); Bryan Garner, St. George, UT (US)

(73) Assignee: SOUNDVISION TECHNOLOGIES, LLC, Hurricane, UT (US)

( * ) Notice: Subject to any disclaimer, the term of this patent is extended or adjusted under 35 U.S.C. 154(b) by 0 days.

(21) Appl. No.: 16/563,698

(22) Filed: Sep. 6, 2019

Related U.S. Application Data

(60) Provisional application No. 62/728,002, filed on Sep. 6, 2018.

(51) Int. Cl.
| H04R 1/02 | (2006.01) |
| F16B 2/02 | (2006.01) |
| E04B 9/00 | (2006.01) |

(52) U.S. Cl.
CPC ............... *H04R 1/026* (2013.01); *F16B 2/02* (2013.01); *H04R 1/025* (2013.01); *E04B 9/006* (2013.01); *H04R 2201/021* (2013.01)

(58) Field of Classification Search
CPC .. H04R 1/026; H04R 1/025; H04R 2201/021; F16B 2/02; E04B 9/006

USPC ......................................... 381/386, 391, 385
See application file for complete search history.

(56) References Cited

U.S. PATENT DOCUMENTS

| 2012/0002835 | A1* | 1/2012 | Stewart, Jr. ............ H04R 1/025 381/386 |
| 2015/0271578 | A1* | 9/2015 | Marcum ................... H04R 1/02 381/395 |
| 2016/0241940 | A1* | 8/2016 | Yang ....................... H04R 1/026 |
| 2016/0366501 | A1* | 12/2016 | Ivey ..................... F16M 13/027 |
| 2018/0058629 | A1* | 3/2018 | Hart ........................ E04B 9/006 |

* cited by examiner

*Primary Examiner* — Fan S Tsang
*Assistant Examiner* — Julie X Dang
(74) *Attorney, Agent, or Firm* — Booth Udall Fuller, PLC

(57) ABSTRACT

A speaker mounting system having a driver housing and a plurality of clamping assemblies is disclosed. The driver housing includes a face surrounded by a flange, a driver and a central axis. The clamping assemblies are coupled to the driver housing, each including an enclosure, a dog ear, an actuator, and a biasing element. Each dog ear has a core, a threading, and an arm, is rotatably coupled to the enclosure along a first axis, and slideable along a path. Each actuator has a body and a threading, and is rotatably coupled to the enclosure along a second axis. Each biasing element biases the dog ear towards the face. Each clamping assembly is movable between a hidden configuration, an extended configuration, and a tightened configuration. The speaker mounting system may also include a powered rough-in assembly having a mounting frame and a wiring block with two terminals and two wires.

20 Claims, 22 Drawing Sheets

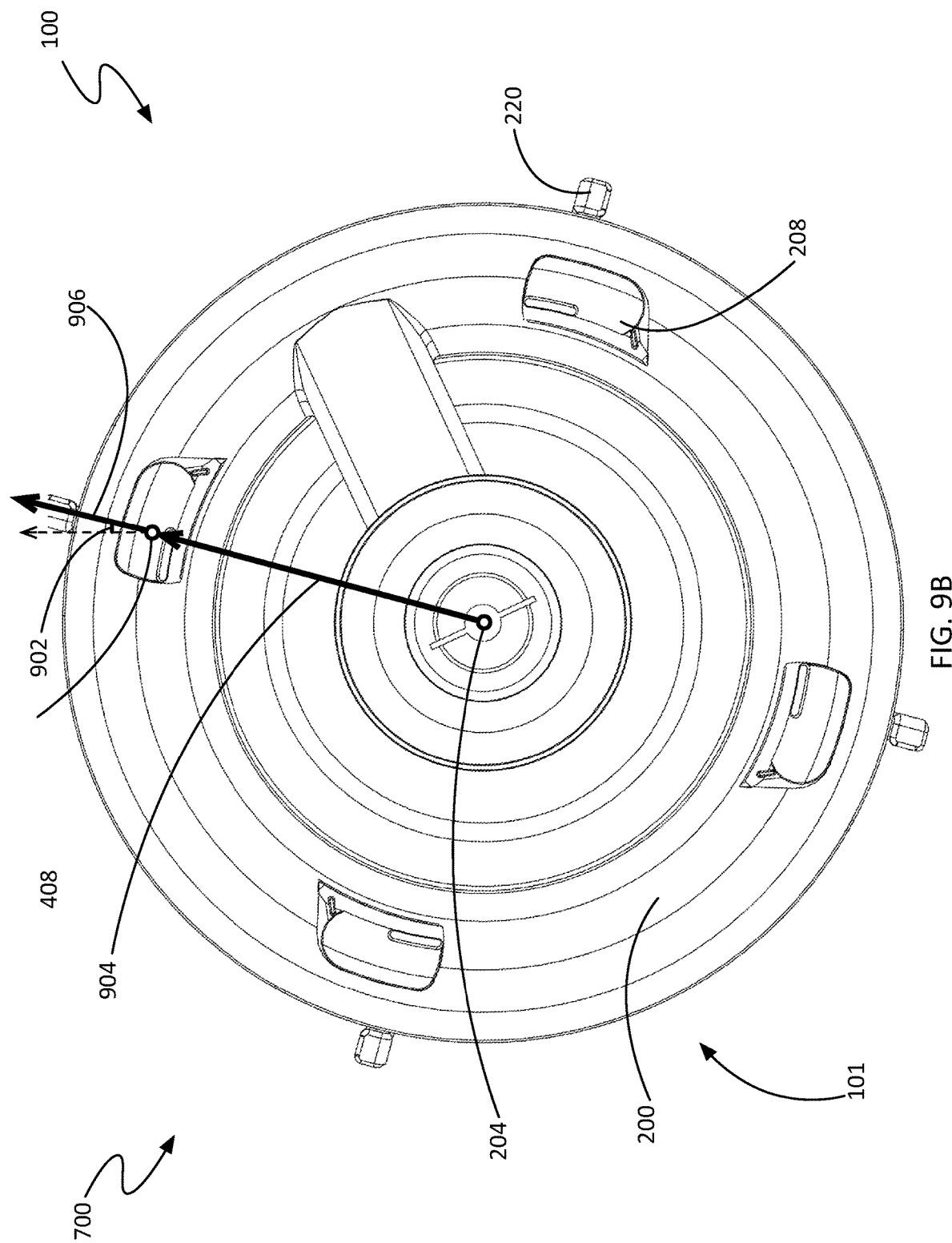

SYSTEM AND METHOD FOR SPEAKER MOUNTING

RELATED APPLICATIONS

This application claims the benefit of U.S. provisional patent application 62/728,002, filed Sep. 6, 2018 titled "Speaker Installation System," the entirety of the disclosure of which is hereby incorporated by this reference.

TECHNICAL FIELD

Aspects of this document relate generally to speaker mounting.

BACKGROUND

Conventional in-ceiling or in-wall speakers can be time consuming to properly install, as even small deviations from ideal installation parameters can often result in noticeable defects, both aesthetic and auditory. Efforts to speed up the installation process often involve cutting corners, with inconsistent results. Toolless speaker clamping mechanisms help improve installation time and consistency. Most conventional toolless clamping mechanisms make use of a single, strong spring to provide the clamping force. While this can speed up the installation of the speaker, there are significant downsides to the single spring approach.

One of the constraints faced by in-ceiling or in-wall speakers is the available height. The enclosure must be able to fit inside the stud bay of a wall, thus limiting the available travel distance of a clamping mechanism. Additionally, there can be wide variations in the thickness of the receiving surface. The wide variety of construction methods and materials (e.g. bead board, drywall, double layered drywall, etc.) means that in order to be broadly applicable, a toolless speaker clamping mechanism will need to deliver clamping force over a range of thicknesses.

Because of the nature of springs, the clamping force decreases as the spring elongates. The space constraints inherent to the size of a typical stud bay means that a fully compressed spring cannot take up much room. The conventional solution to these constraints is the use of a high-bias spring that has just barely enough clamping force at the smallest end of the range of clamping thickness, but not too much force at the thickest end of the clamping range. Because of this, there is typically a wide differential of clamping force between the widest and narrowest ends of the clamping range.

Another way installation may be done more efficiently and consistently is through the use of rough-in mounts, which can help provide a cleaner and stronger installation point. However, one problematic aspect of using conventional rough-in mounts is that the speaker wire is left hanging out of the mount, or somewhere inside the wall, where it can be tangled, damaged, or lost during the trim-out phase.

SUMMARY

According to one aspect, a speaker mounting system includes a driver housing having a face surrounded by a flange, a driver, two wire terminals, a plug receiver, and a central axis. The two wire terminals and the plug receiver are communicatively coupled to the driver. The speaker mounting system also includes a plurality of clamping assemblies coupled to the driver housing. Each clamping assembly includes an enclosure, a dog ear, an actuator, an installation lever, and a biasing element. The dog ear includes a core with a front end and a rear end distal to the front end. The dog ear further includes a threading, and an arm extending outward from the core. The dog ear is rotatably coupled to the enclosure along a first axis of the clamping assembly passing through the front and rear ends, and is slideable along a path. The path has a first end and a second end, the second end distal to the first end and closer to the face than the first end. The path further defines the orientation of the arm with respect to the first axis. The actuator includes a body and a threading. The actuator is rotatably coupled to the enclosure along a second axis parallel to and separate from the first axis. The installation lever is coupled to the actuator through the second axis and is shaped to sit flush with the face of the driver housing. The biasing element is coupled to the rear end of the core of the dog ear and the enclosure. The biasing element biases the dog ear towards the face of the driver housing. Each clamping assembly is movable between a hidden configuration, an extended configuration, and a tightened configuration. The hidden configuration includes the dog ear being closer to the first end of the path than the second end, and the arm extending in a hidden direction that is closer to perpendicular to a line between the first axis and the central axis than parallel. The extended configuration includes the dog ear being closer to the second end of the path than when in the hidden configuration, the arm extending in an extended direction that is closer to parallel to the line between the first axis and the central axis than perpendicular, and the arm in contact with a receiving surface. The tightened configuration includes the dog ear being closer to the second end of the path than when in the extended configuration, the threading of the core engaged with the threading of the actuator, and the receiving surface clamped between the arm and the flange. For each clamping assembly of the plurality of clamping assemblies, the clamping assembly is maintained in the hidden configuration when the actuator is rotated about the second axis to place the body of the actuator in contact with a portion of the dog ear, with a portion of the actuator body positioned on the path between the dog ear core and the second end, obstructing the dog ear from rotating about the first axis and moving along the path toward the second end. Also, the clamping assembly is driven from the hidden configuration to the extended configuration by the biasing element when the actuator is rotated, placing the portion of the actuator body outside the path and allowing the dog ear core to rotate about the first axis and move along the path toward the second end. Each clamping assembly is driven from the extended configuration to the tightened configuration by the rotation of the actuator via the installation lever while the threading of the actuator is engaged with the threading of the dog ear core. Finally, the driver housing and the plurality of clamping assemblies makes up a speaker module.

Particular embodiments may comprise one or more of the following features. For each clamping assembly, the installation lever may be fixedly coupled to the actuator body. Also, for each clamping assembly, the installation lever may be releasably coupled to the actuator body. Furthermore, for each clamping assembly, the threading of the dog ear core may be a spiral threading, and may spiral along the first axis. The speaker mounting system may also include a powered rough-in assembly. The powered rough-in assembly may include a mounting frame, and/or a wiring block. The mounting frame that may be annular, and may include an inner perimeter that may be sized and shaped to receive the speaker module, and/or an outer perimeter that may have a polygonal shape with a plurality of edges. The wiring block may be coupled to a first edge of the plurality of edges of the mounting frame. The wiring block may include two spring-type terminals and/or two wires. Each terminal may be communicatively coupled to a first end of a different wire of the two wires. The plurality of edges may include at least one edge that may be a flange that may include a plurality of countersunk holes. The plurality of edges may also include at least two edges releasably coupled to metal wings. The second ends of the two wires may be coupled to a plug mated with the plug receiver of the driver housing, communicatively coupling the driver with the terminals of the rough-in assembly.

According to another aspect of the disclosure, a speaker mounting system includes a driver housing having a face surrounded by a flange, a driver and a central axis. The speaker mounting system also includes a plurality of clamping assemblies coupled to the driver housing. Each clamping assembly includes an enclosure, a dog ear, an actuator, and a biasing element. The dog ear includes a core with a front end and a rear end distal to the front end. The dog ear further includes a threading and an arm extending outward from the core. The dog ear is rotatably coupled to the enclosure along a first axis of the clamping assembly passing through the front and rear ends, and is slideable along a path. The path has a first end and a second end, the second end distal to the first end and closer to the face than the first end, and further defining the orientation of the arm with respect to the first axis. The actuator includes a body and a threading. The actuator is rotatably coupled to the enclosure along a second axis. The biasing element is coupled to the rear end of the core of the dog ear and the enclosure, biasing the dog ear towards the face of the driver housing. Each clamping assembly is movable between a hidden configuration, an extended configuration, and a tightened configuration. The hidden configuration includes the dog ear closer to the first end of the path than the second end, and the arm extending in a hidden direction that is closer to perpendicular to a line between the first axis and the central axis than parallel. The extended configuration includes the dog ear closer to the second end of the path than when in the hidden configuration, the arm extending in an extended direction that is closer to parallel to the line between the first axis and the central axis than perpendicular, and the arm in contact with a receiving surface. The tightened configuration includes the dog ear closer to the second end of the path than when in the extended configuration, the threading of the core engaged with the threading of the actuator, and the receiving surface clamped between the arm and the flange. For each clamping assembly of the plurality of clamping assemblies, the clamping assembly is maintained in the hidden configuration when the actuator is rotated about the second axis to place the body of the actuator in contact with a portion of the dog ear, with a portion of the actuator body positioned on the path between the dog ear core and the second end, obstructing the dog ear from rotating about the first axis and moving along the path toward the second end. For each clamping assembly of the plurality of clamping assemblies, the clamping assembly is driven from the hidden configuration to the extended configuration by the biasing element when the actuator is rotated, placing the portion of the actuator body outside the path and allowing the dog ear core to rotate about the first axis and move along the path toward the second end. Each clamping assembly is driven from the extended configuration to the tightened configuration by the rotation of the actuator while the threading of the actuator is engaged with the threading of the dog ear core. The driver housing and the plurality of clamping assemblies makes up a speaker module.

Particular embodiments may comprise one or more of the following features. For each clamping assembly, the arm of the dog ear may be closer to the central axis than the flange of the driver housing when the clamping assembly is in the hidden configuration. Each clamping assembly of the plurality of clamping assemblies may further include an installation lever that may be coupled to the actuator through the second axis and may be shaped to sit flush with the face of the driver housing. For each clamping assembly, the installation lever may be fixedly coupled to the actuator body. Also, for each clamping assembly, the installation lever may be releasably coupled to the actuator body. For each clamping assembly, the installation lever may cover an opening providing access to the dog ear. For each clamping assembly, the arm of the dog ear may have a grip. The second axis may be parallel to and/or separate from the first axis. The driver housing may further include the driver communicatively coupled to at least one of a plug receiver and/or two wire terminals. For each clamping assembly, the threading of the dog ear core may be a spiral threading, spiraling along the first axis. The speaker mounting system may further include a powered rough-in assembly having two wire terminals, two wires, and/or a mounting frame that may be annular. The mounting frame may include an inner perimeter sized and shaped to receive the speaker module, and/or an outer perimeter. Each terminal of the powered rough-in assembly may be communicatively coupled to the driver of the driver housing.

According to yet another aspect of the disclosure, a method for installing a speaker mounting system includes preparing the speaker mounting system for installation. The speaker mounting system includes a speaker module having a plurality of clamping assemblies and a driver housing having a central axis. The face is surrounded by a flange. Said preparing for installation includes placing each clamping assembly in a hidden configuration. Each clamping assembly of the plurality of clamping assemblies includes an enclosure, a dog ear, an actuator, and a biasing element. The dog ear includes a core with a front end and a rear end distal to the front end. The dog ear further includes a threading and an arm extending outward from the core. The dog ear is rotatably coupled to the enclosure along a first axis of the clamping assembly passing through the front and rear ends, and is slideable along a path. The path has a first end and a second end, the second end distal to the first end and closer to the face of the driver housing than the first end. The path further defines the orientation of the arm with respect to the first axis. The actuator includes a body and a threading. The actuator is rotatably coupled to the enclosure along a second axis. The biasing element is coupled to the rear end of the core of the dog ear and the enclosure, biasing the dog ear towards the face of the driver housing. The hidden configuration includes the dog ear closer to the first end of the path than the second end, and the arm extending in a hidden direction that is closer to perpendicular to a line between the first axis and the central axis than parallel. The method also includes inserting the speaker mounting system through an opening in a receiving surface such that the face of the driver housing is on a room side of the receiving surface and a majority of each clamping assembly is on a wall side of the receiving surface opposite the room side. The method further includes releasing, for each clamping assembly of the plurality of clamping assemblies, the clamping assembly from the hidden configuration, allowing the biasing element to drive the clamping assembly to an extended configuration. The extended configuration includes the dog ear closer to the second end of the path than when in the hidden configuration, the arm extending in an extended direction that is closer to parallel to the line between the first axis and the central axis than perpendicular, The arm is in contact with the wall side of the receiving surface. Finally, the method includes driving, for reach clamping assembly of the plurality of clamping assemblies, the clamping assembly from the extended configuration to a tightened configuration by rotating the actuator while the threading of the actuator is engaged with the threading of the dog ear core. The tightened configuration includes the dog ear closer to the second end of the path than when in the extended configuration, the threading of the core engaged with the threading of the actuator, and the receiving surface clamped between the arm and the flange.

Particular embodiments may comprise one or more of the following features. Placing each clamping assembly of the plurality of clamping assemblies in the hidden configuration may include moving the dog ear core to the first end of the path while compressing the biasing element, and/or rotating the actuator about the second axis to place the body of the actuator in contact with a portion of the dog ear, and/or place a portion of the actuator body on the path between the dog ear core and the second end, obstructing the dog ear from rotating about the first axis and/or moving to the extended configuration. Releasing each clamping assembly of the plurality of clamping assemblies from the hidden configuration may include rotating the actuator about the second axis to place the portion of the actuator body outside the path, allowing the dog ear core to rotate about the first axis and be driven along the path toward the second end by the biasing element. The method may also include coupling a powered rough-in assembly to at least one joist before installation of the receiving surface. The powered rough-in assembly may include two wire terminals, two wires, and/or a mounting frame that is annular. The mounting frame may include an inner perimeter sized and shaped to receive the speaker module, and/or an outer perimeter. Each terminal may be coupled to a first end of a different wire of the two wires, and the second ends of the two wires may be coupled to a plug. The method may also include communicatively coupling the powered rough-in assembly to a sound system wiring installed before installation of the receiving surface. The method may further include communicatively coupling the speaker mounting system to the sound system wiring after installation of the receiving surface and before inserting the speaker mounting system through the opening in the receiving surface by mating the plug of the powered rough-in assembly with a plug receiver of the driver housing. Finally, the tightened configuration may further include clamping the receiving surface and/or a portion of the mounting frame of the powered rough-in assembly between the arm and the flange.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIG. 9B is a front view of a speaker mounting system in a tightened configuration;

DETAILED DESCRIPTION

Figure 1:
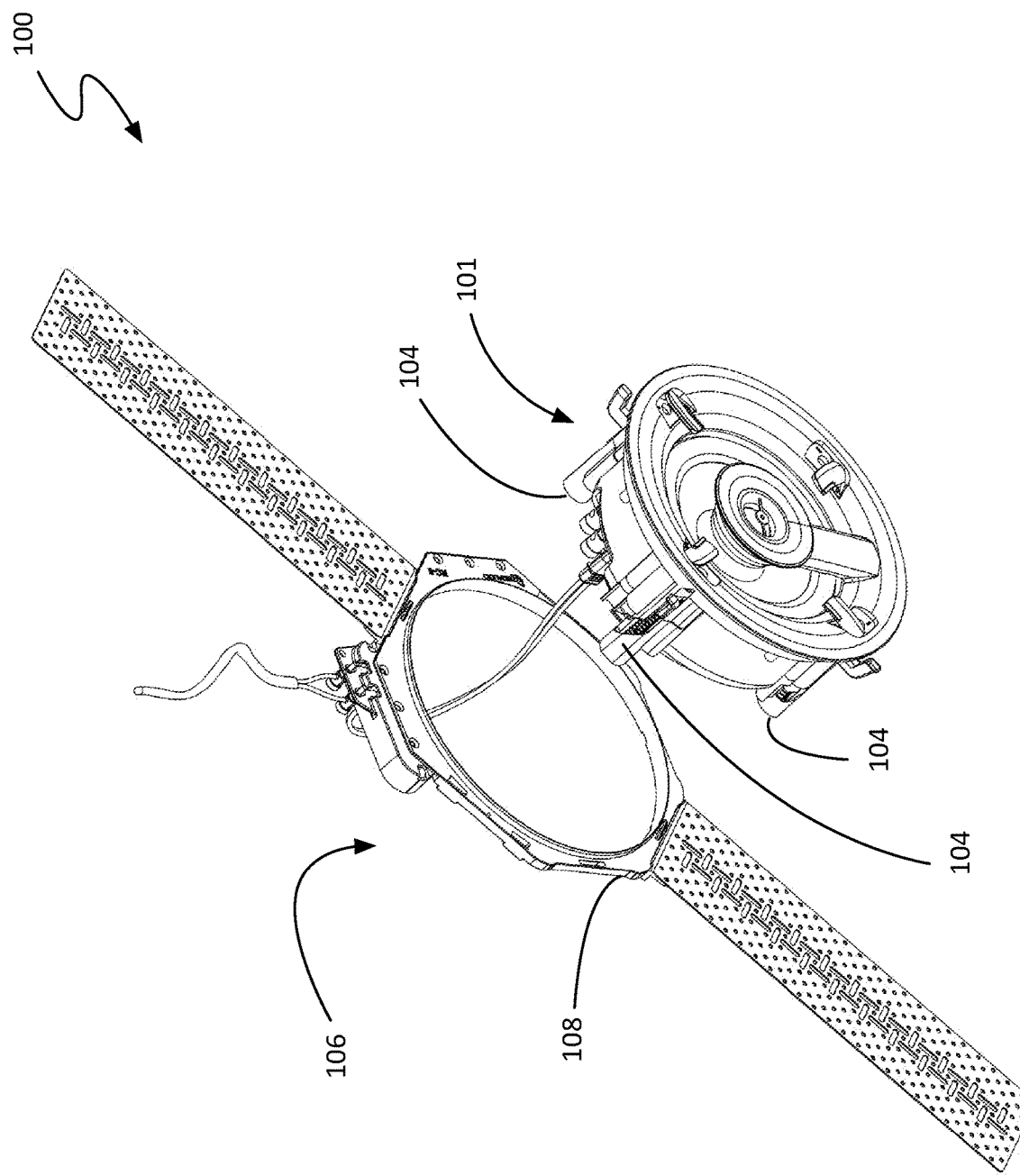
FIG. 1 is a perspective view of a speaker mounting system including a powered rough-in assembly.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Conventional in-ceiling or in-wall speakers can be time consuming to properly install, as even small deviations from ideal installation parameters can often result in noticeable defects, both aesthetic and auditory. Efforts to speed up the installation process often involve cutting corners, with inconsistent results. Toolless speaker clamping mechanisms help improve installation time and consistency. Most conventional toolless clamping mechanisms make use of a single, strong spring to provide the clamping force. While this can speed up the installation of the speaker, there are significant downsides to the single spring approach.

One of the constraints faced by in-ceiling or in-wall speakers is the available height. The enclosure must be able to fit inside the stud bay of a wall, thus limiting the available travel distance of a clamping mechanism. Additionally, there can be wide variations in the thickness of the receiving surface. The wide variety of construction methods and materials (e.g. bead board, drywall, double layered drywall, etc.) means that in order to be broadly applicable, a toolless speaker clamping mechanism will need to deliver clamping force over a range of thicknesses.

Because of the nature of springs, the clamping force decreases as the spring elongates. The space constraints inherent to the size of a typical stud bay means that a fully compressed spring cannot take up much room. The conventional solution to these constraints is the use of a high-bias spring that has just barely enough clamping force at the smallest end of the range of clamping thickness, but not too much force at the thickest end of the clamping range. Because of this, there is typically a wide differential of clamping force between the widest and narrowest ends of the clamping range.

Because the end user still needs to be able to retract the spring, and because the (typically) plastic housing still needs to constrain the compressed spring, most toolless designs tend to err on the side of a spring that is just barely sufficient for clamping under ideal circumstances. Circumstances where the receiving surface (e.g. wall, ceiling, etc.) is crooked, or the drywall mud has been applied inconsistently are not uncommon. In such circumstances, these conventional clamping mechanisms do not have enough force for a proper mounting, and the end results is a speaker having a less desirable appearance and performance.

Conventional toolless clamps for speaker installation often rely on a trigger mechanism to cause the clamp to engage. The mechanism is commonly triggered when it comes into contact with the drywall. If the triggering occurs before the installer wishes, it could prevent them from making final adjustments to the position of the speaker (e.g. to cover a blemish in the drywall, etc.). Single spring mechanisms tend to be all-or-nothing. Another drawback of these conventional toolless clamping mechanisms is the lack of feedback. Sometimes, because of imperfections in the drywall, or the hole cut for the speaker being too big, there is nothing inside the wall to trigger the clamping mechanism. The only feedback the installer has that the clamping mechanisms have engaged correctly is the initial sound of the clamps slamming into place from the force of the spring.

Contemplated herein is a speaker mounting system comprising a driver housing having a number of two-stage clamping assemblies that can be quickly installed with consistent quality, without requiring tools. Some embodiments of the system further comprise a powered or pre-wired rough-in assembly, allowing an installer to terminate the speaker wire during the rough-in stage, further streamlining the installation process.

The two-stage clamping assembly makes use of a lightweight spring for the initial clamping, and a secondary clamping mechanism to achieve the needed clamping force for proper installation. Because the spring is only a small contributor to the overall clamping force, the clamping forces available ore much more uniform throughout the clamping thickness range. Furthermore, separating the clamping into stages facilitates much higher clamping forces by applying the second clamping stage over only the range needed for clamping.

The use of a lightweight spring, unlike the strong springs of conventional single-spring mechanisms, makes it easy for the installer to compress the spring to retract and reset the clamping mechanism for easier installation preparation and/or removal of an already installed speaker. Additionally, the systems and methods contemplated herein give the installer more control over when the final clamping force is applied. The two-stage design allows an installer to activate the first stage, make final adjustments, then apply the final clamping force, while being aware of exactly where the mechanism is at in these stages. The installer knows when the mechanisms have completed the first and second stages because they can actually feel the clamping taking place as the force is applied.

FIG. 1 is a perspective view of a non-limiting embodiments of a speaker mounting system 100 comprising a speaker module 101 and a powered rough-in assembly 106. As shown, the speaker module 101 includes a plurality of clamping assemblies 104 which are two-stage. The speaker module 101 and clamping assemblies 104 will be discussed in greater detail with respect to FIGS. 2-9, below. The system 100 may also include a powered rough-in assembly 106 comprising a mounting frame 108. The powered rough-in assembly 106 will be discussed in greater detail with respect to FIGS. 10-14, below. Those skilled in the art will recognize that the speaker mounting systems 100, and specifically the speaker module 101 and powered rough-in assemblies 106, contemplated herein may be adapted for use with any in-wall or in-ceiling speaker known in the art, or speakers installed in other environments.

Figure 2A:
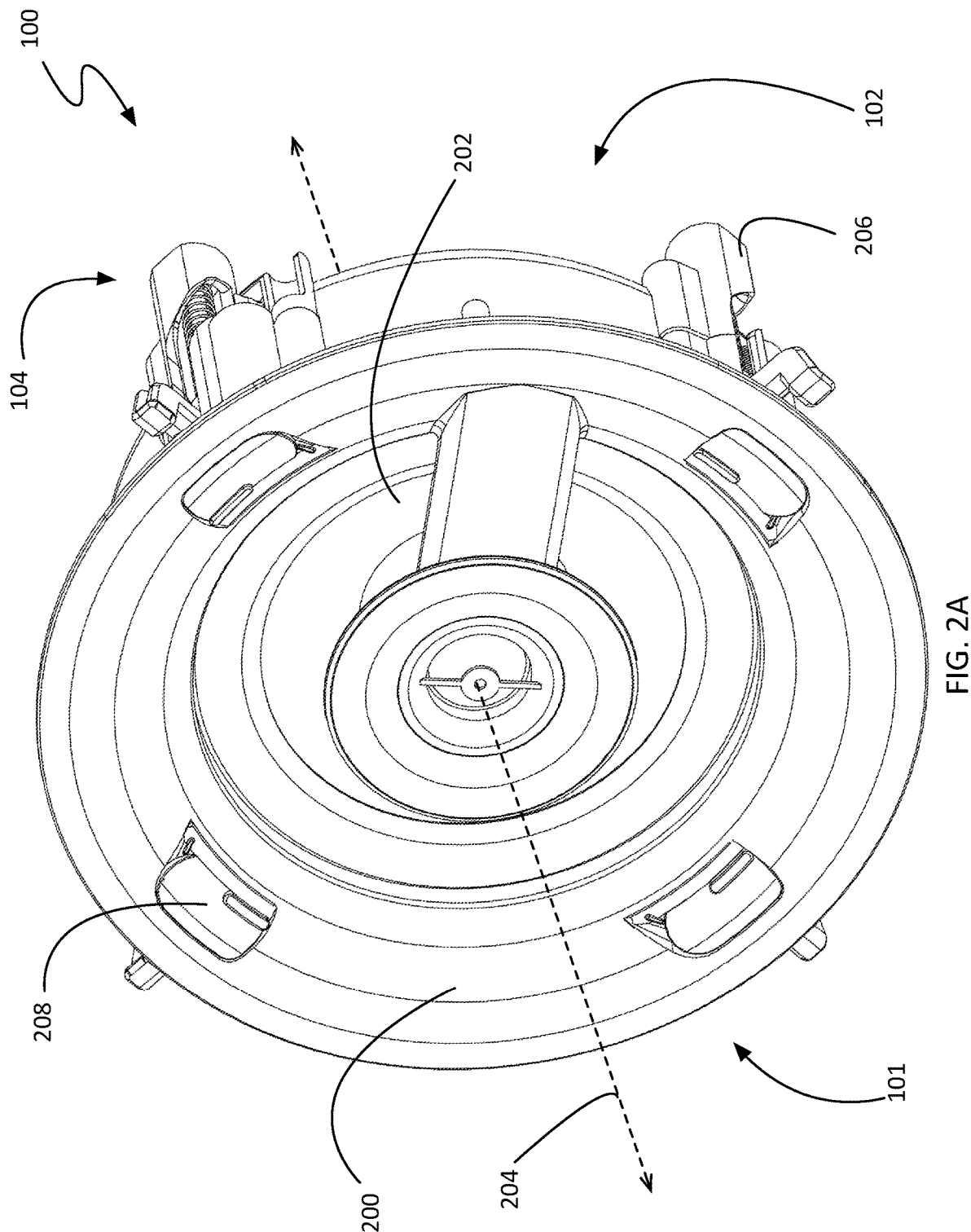
FIGS. 2A and 2B are front perspective views of a speaker mounting system, assembled and exploded, respectively.
Figure 2B:
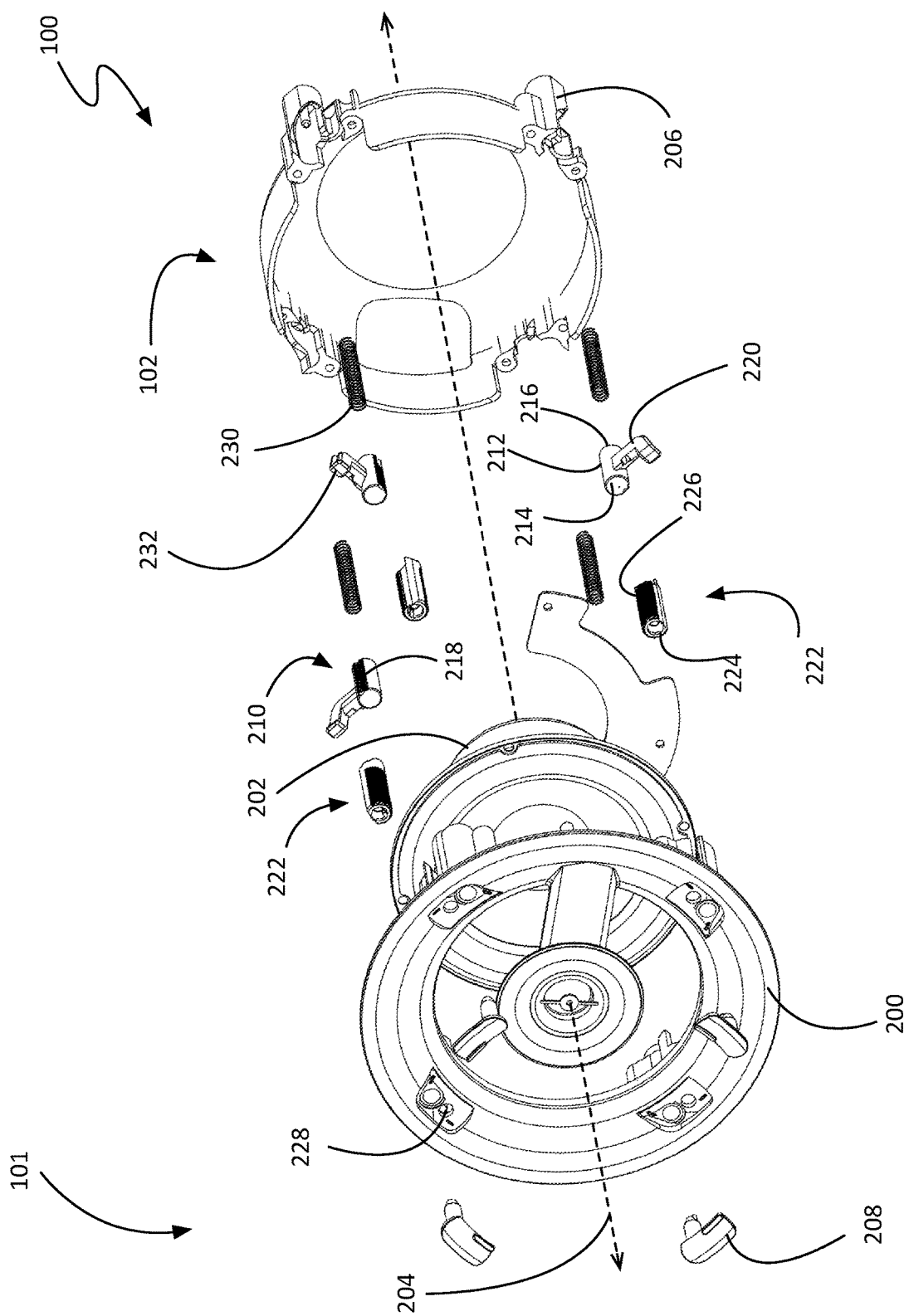
Figure 3A:
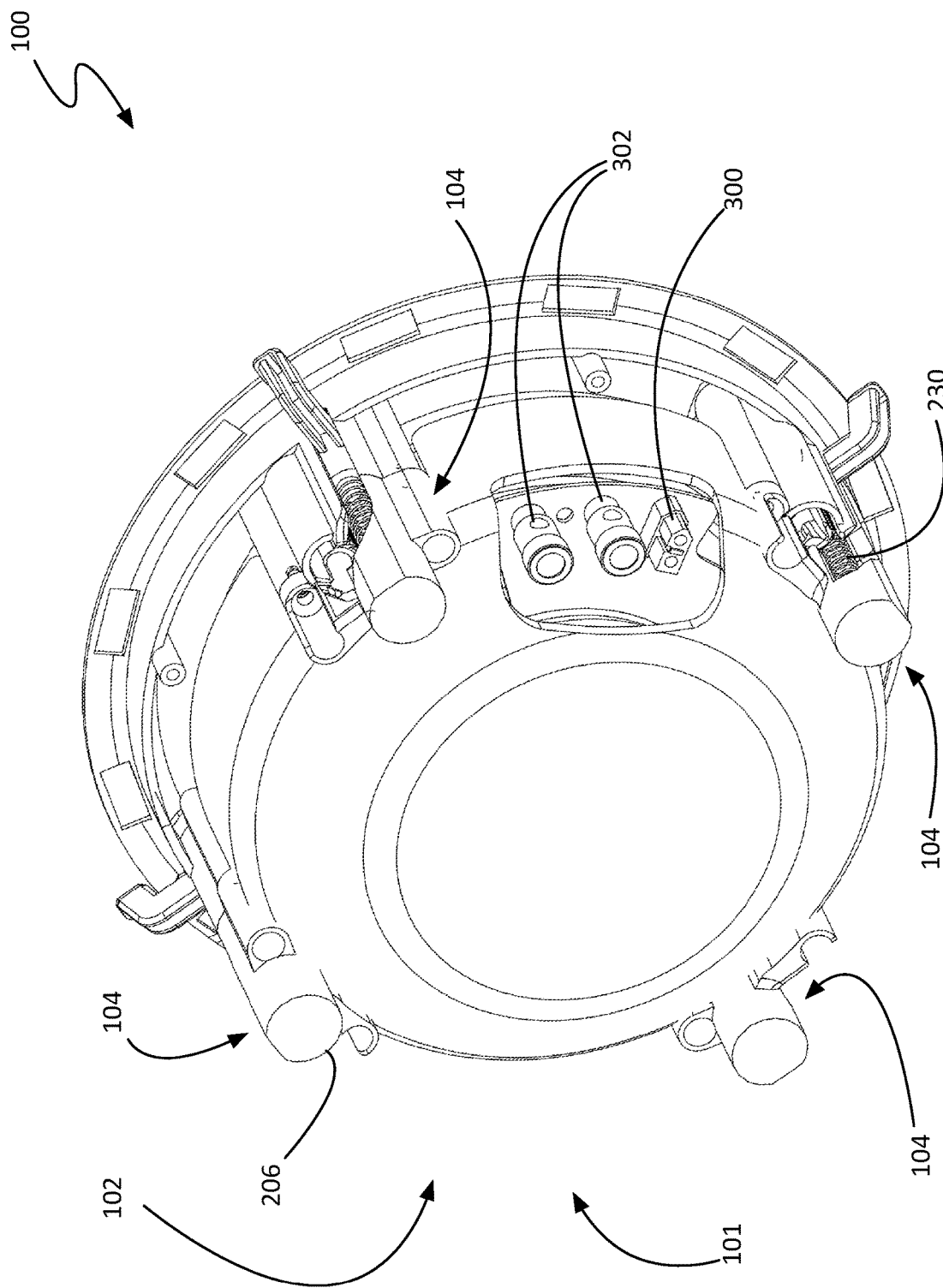
FIGS. 3A and 3B are rear perspective views of a speaker mounting system, assembled and exploded, respectively.
Figure 3B:
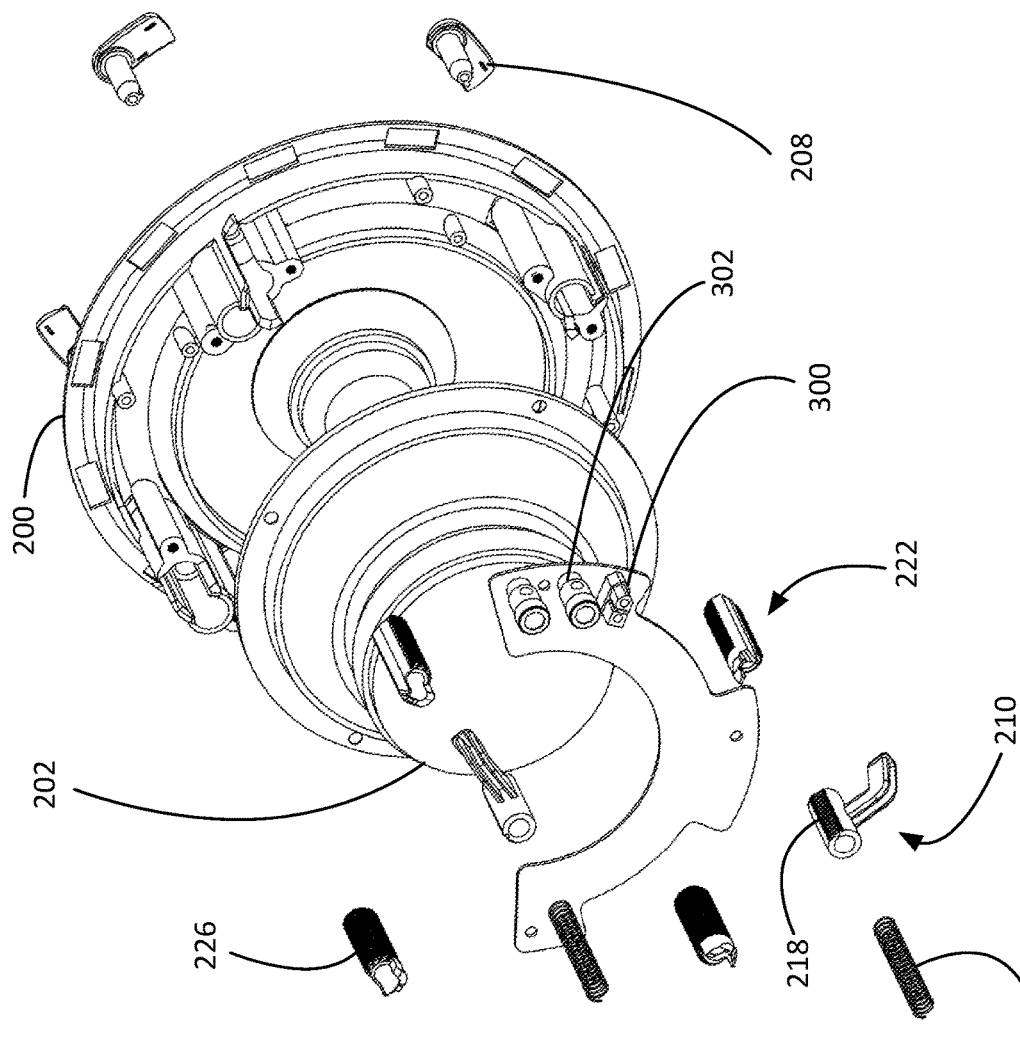
Figure 3B:
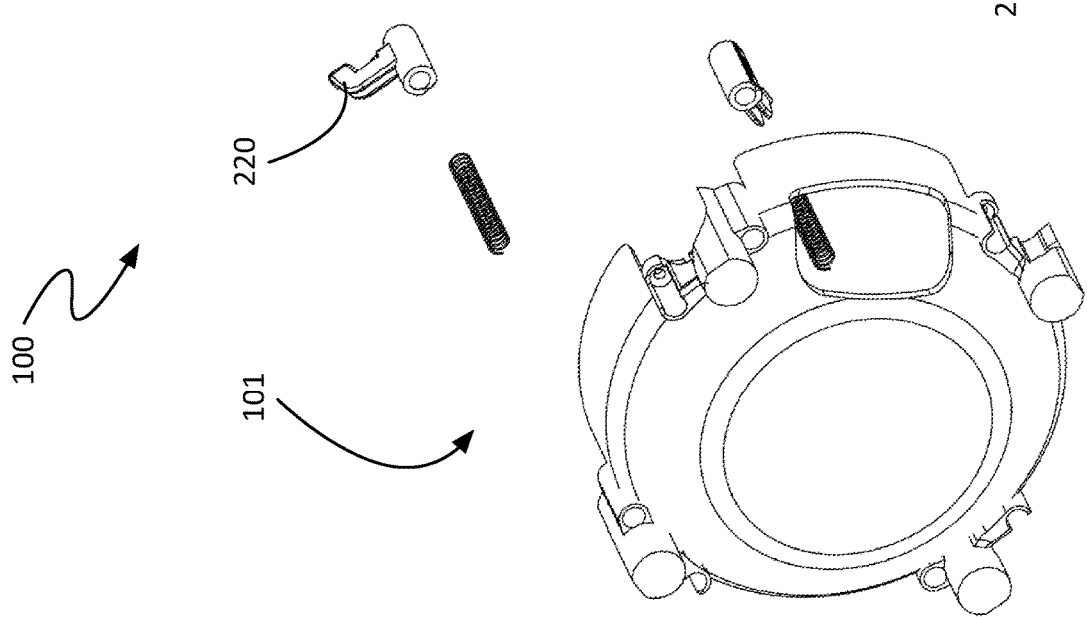
Figure 4A:
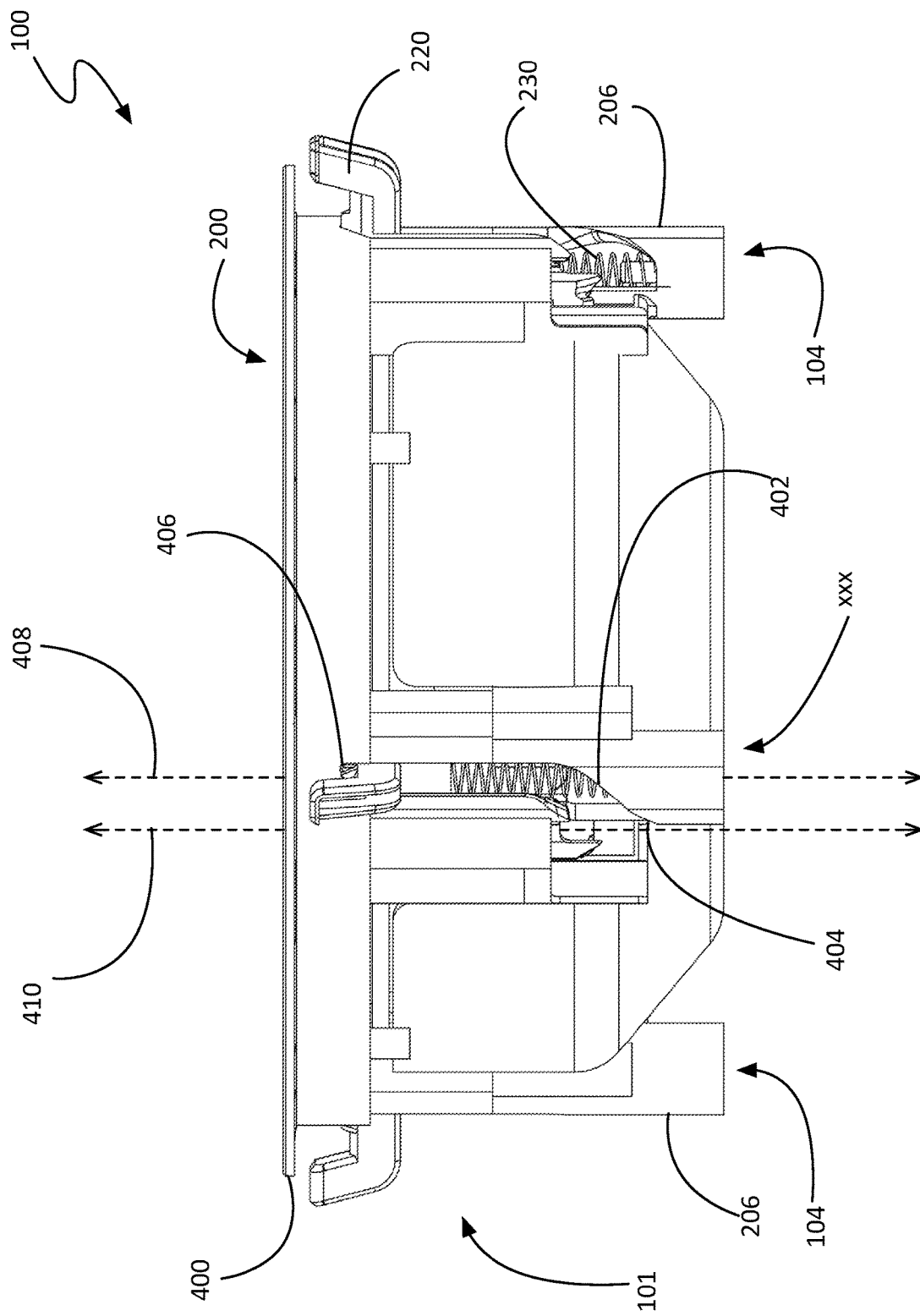
FIGS. 4A and 4B are side views of a speaker mounting system, assembled and exploded, respectively.
Figure 4B:
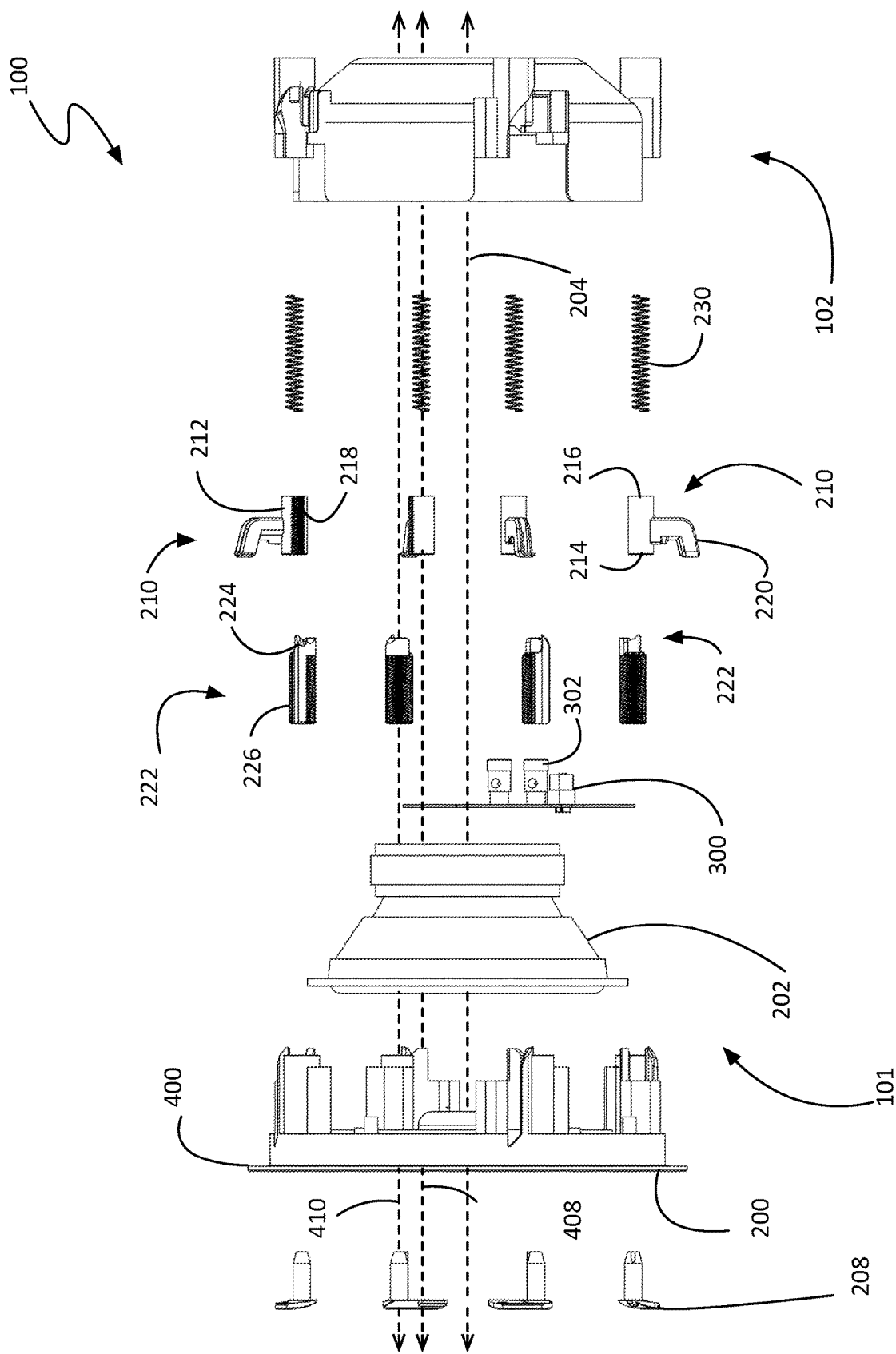

FIGS. 2-4 are perspective and side views of a non-limiting example of a speaker mounting system 100 comprising a speaker module 101. Specifically, FIGS. 2A and 2B are front perspective views of a speaker mounting system 100, assembled and exploded, respectively. FIGS. 3A and 3B are rear perspective views of a speaker mounting system 100, assembled and exploded, respectively, and FIGS. 4A and 4B are side views of a speaker mounting system 100, assembled and exploded, respectively.

As shown, the speaker module 101 comprises a driver housing 102 and a plurality of clamping assemblies 104. According to various embodiments, the driver housing 102 encloses, or at least partially encloses, a speaker driver 202 and accompanied electronics. It should be noted that while the following disclosure and figures depict a speaker module 101 having a single speaker driver 202, other embodiments may comprise two, three, or more speaker drivers 202 in a single speaker module 101, as is known in the art. As a specific example, in one embodiment, the speaker module 101 may have three drivers 202, a woofer, a tweeter, and a crossover. Those skilled in the art will recognize that the speaker mounting system 100 may be adapted for use with any speaker driver 202 or collection of speaker drivers 202 intended for installation in a receiving surface.

The driver housing 102 comprises a face 200 and a driver 202. The face 200 makes up part of the front surface of the speaker module 101, which may or may not be covered by a grille (not shown) or other decorative feature. As shown, the face 200 may be surrounded by a flange 400 which, working in conjunction with the clamping assemblies 104, is used to clamp a receiving surface. The driver housing 102 also comprises a central axis 204.

The speaker module 101 also comprises a plurality of clamping assemblies 104 coupled to the driver housing 102. The non-limiting embodiments shown in FIGS. 1-9 show a speaker module 101 having four clamping assemblies 106. Other embodiments may have 3, 5, 6, or more clamping assemblies 106. The number of clamping assemblies 106 used in a speaker module 101 may depend on the size, shape, and weight of the driver housing 102, and the driver 202 therein. Some embodiments may use one or two clamping assemblies 106 in conjunction with other clamping or installation mechanisms. Those skilled in the art will recognize that the clamping assemblies 106 contemplated herein may be adapted for use with any driver housing 102 known in the art for the purpose of installation in a receiving surface.

As shown, each clamping assembly 104 comprises a dog ear 210, an actuator 222, and a biasing element 230, contained within an enclosure 206 coupled to the driver housing 102. In some embodiments, the enclosure 206 may be coupled to the driver housing 102 after manufacture, while in other embodiments, the enclosure 206 may be formed integral with the driver housing 102 at the time of manufacture.

The dog ear 210 is the portion of the clamping assembly 104 that directly engages with the receiving surface. According to various embodiments, the dog ear 210 comprises a core 212 having a front end 214 (e.g. facing the face 200 of the speaker module 101), a rear end 216 distal to the front end 214 (e.g. facing towards the biasing element 230). The dog ear 210 further comprises a threading 218, and an arm 220 that extends outward from the core 212. In some embodiments, the threading 218 may be on the core 212 of the dog ear 210, while in other embodiments, the threading 218 may extend onto, or be entirely localized, on the arm 220.

The arm 220 is the portion of the dog ear 210 that extends outside of the enclosure 206 and, upon installation, exerts clamping force directly onto the receiving surface. As an option, the arm 220 may have a grip 232, or a surface that makes contact with the receiving surface. The grip 232 may be textured to provide a better mounting.

Each clamping assembly 104 also includes an actuator 222. According to various embodiments, the actuator 222 is rotated to turn the dog ear 210 and exert clamping force on a receiving surface. The actuator 222 may also serve to maintain the speaker module 101 in a ready-to-install state, called the hidden configuration 500, which will be discussed with respect to FIGS. 5A and 5B, below. The actuator 222 comprises a body 224, and a threading 226 that can engage with the threading 218 of the dog ear 210.

The dog ear 210 and the actuator 222 may be composed of any materials know to the art for construction of speaker enclosures or driver housings 102. Examples include, but are not limited to, thermoplastic, metal, and the like. Since the biasing element 230 used is not as intense as those used in conventional single-spring mechanisms, the components of the clamping assemblies 106 do not need to be as robust, resulting in potential manufacturing and/or economic advantages.

The biasing element 230 sits between the read 216 of the dog ear 210 and the enclosure 206, and biasing the dog ear 210 toward the face 200 of the driver housing 102. In some embodiments, the biasing element 230 may be a spring. In other embodiments, any of the other sources of bias known in the art may be used. Advantageous over conventional mechanisms, the biasing element 230 does not need to provide the full clamping force, but rather is used to put the dog ear 210 in position for application of the full clamping force provided by the threaded interaction between the dog ear 210 and the actuator 222, as will be discussed below.

According to various embodiments, each clamping assembly 104 has an installation lever 208 that is coupled to the actuator 222 through the second axis 410. The installation lever 208 may be accessible from the face 200 of the driver housing 102. In some embodiments, the installation lever 208 may sit flush with a surface of the face 200. The installation lever 208 allows the installer to rotate the actuator 222 without requiring the use of a tool. Other embodiments may omit the installation lever 208, and may provide another mechanism for the installer to rotate the actuator 222, or provide access to the actuator 222 for rotation using a tool, like a screwdriver.

As shown, in some embodiments, the installation levers 208 may have a tab or other structure that would allow an installer to push the otherwise flush lever 208 without requiring tools. Other embodiments may have a completely flush surface, and may require the use of a tool to operate the lever 208.

In some embodiments, the installation lever 208 may be fixedly coupled to the actuator body 224, meaning rotating the lever 208 will always rotate the actuator 222 about the second axis 410. In other embodiments, the installation lever 208 may be releasably coupled to the actuator body 224, allowing the installer to engage the coupling, rotate the actuator 222 until the desired amount of clamping force is being applied, and then disengage the coupling to place the lever 208 flush with the face 200 again, all the while maintaining the relative orientation of the actuator 222 (and the clamping force).

According to various embodiments, the driver housing 102 may comprise one or more means to communicatively couple the driver 202 with a sound source such as a stereo. These means may include, but are not limited to, wire terminals 302, and a plug receiver 300. The plug receiver 300 may be sized and shaped to mate with a plug on a cable to make the connection between the driver 202 and a sound source. The use of a plug and plug receiver 300 may be advantageous as it makes installation quick and consistent, and may be less apt to accidently become disconnected during the installation process (e.g. the plug and plug receiver 300 may be formed with a locking mechanism, etc.). Some embodiments may have two or more different means for coupling the driver 202 to a sound source. In some embodiments, a wire terminal 302 may be a spring-type terminal, as is known in the art.

As shown, in some embodiments, the face 200 may include an opening 228 positioned over each clamping assembly 104, allowing access to the dog ear 210 within the enclosure 206. In some embodiments, the installation levers 208 may rotate to cover the openings 228 when they are made flush with the face 200. The openings 228 may be used to insert a tool to push the dog ear 210 down to the bottom of the enclosure 206 in preparation for installation. Such preparations will be discussed further, below, with respect to FIGS. 5A and 5B.

FIGS. 4A and 4B are side views of a non-limiting embodiment of a speaker mounting system 100, assembled and exploded, respectively. As mentioned above, in each clamping assembly 104, the dog ear 210 is rotatably coupled to the enclosure 206 along a first axis 408, and the actuator 222 is rotatably coupled to the driver housing 102 along a second axis 410. In the context of the present description and the claims that follow, these elements being rotatably coupled to the enclosure 206 along a first 408 or second 410 axis means that they are able to rotate about that axis within the enclosure 206. The dog ear 210 is also able to move along the first axis 410 as the speaker module 101 is being installed. The first axis 408 passes through the front and rear ends of the dog ear core 212. The second axis 410 passes through the actuator 222. In some embodiments the first axis 408 and second axis 410 may be parallel (and separate), while in other embodiments they may be non-parallel to each other.

As shown in FIGS. 4A and 4B, the arm 220 of the dog ear 210 extends out of the enclosure 206, which has a slot or opening that gives the dog ear 210 access to the receiving surface, and also constrains a relationship between the rotation of the dog ear 210 and its height with respect to the face 200 of the driver housing 102. The dog ear 210 is slideably along this path 402, which has a first end 404 and a second end 406, with the second end 406 being closer to the face 200 than the first end 404. The path 402 is shaped such that, as the biasing element 230 drives the dog ear 210 toward the second end 406, it rotates such that the arm 220 spins outward in preparation for clamping. In some embodiments, the path 402 may be linear, while in others it may have one or more curved portions. The path 402 defines the limits of dog ear 210 travel, and further defines the orientation of the dog ear 210 with respect to the first axis, as will be discussed with respect to FIGS. 9A and 9B, below.

According to various embodiments, each clamping assembly 104 is movable between a hidden configuration 500, an extended configuration 700, and a tightened configuration 800. In the context of the present description and the claims that follow, a configuration is a relative arrangement, in terms of both location and orientation, of the different elements of the clamping assembly 104. Said configurations may be used to described a speaker module 101 as a whole, as well, when all of the clamping assemblies 104 of the module 101 are in that particular configuration. Each of these configurations will be discussed in turn, below.

Figure 5A:
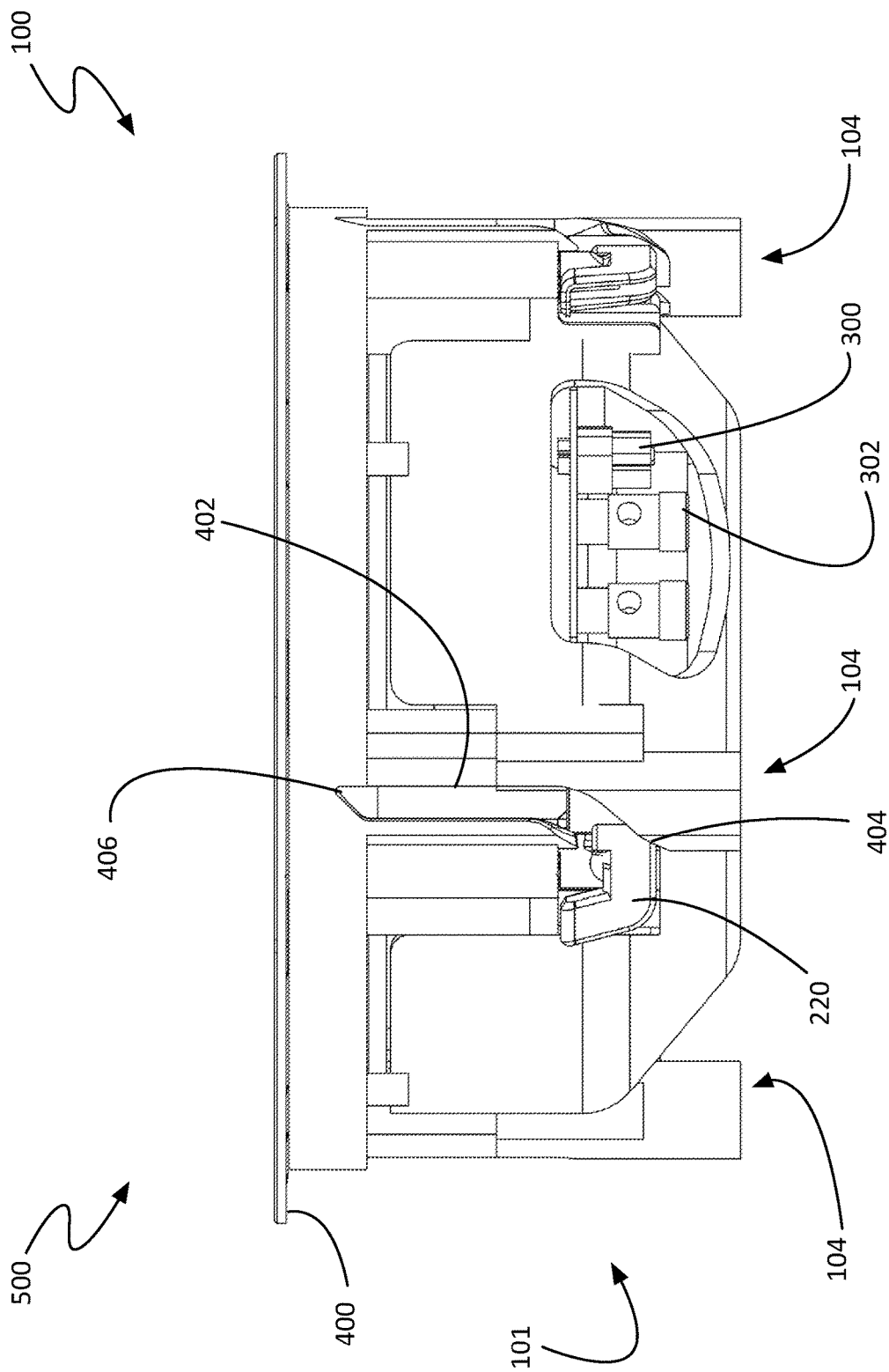
FIG. 5A is a side view of a speaker mounting system in a hidden configuration.
Figure 5B:
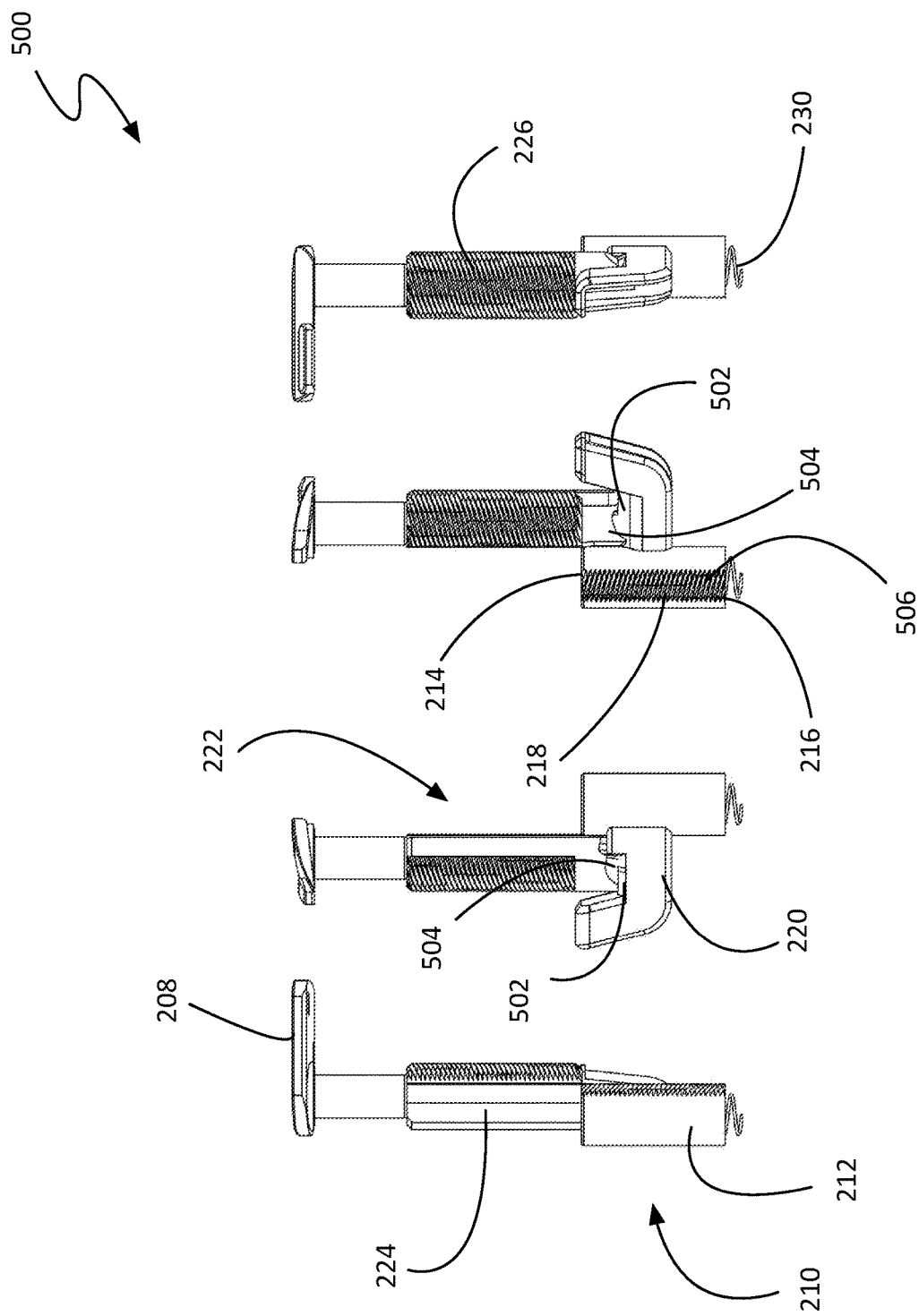
FIG. 5B is a side view of the internal members of the clamping assemblies of the speaker mounting system of FIG. 5A.

FIG. 5A is a side view of a non-limiting example of a speaker module 101 of a speaker mounting system 100 in a hidden configuration 500. FIG. 5B is the same view, except only the internal members (i.e. dog ear 210, actuator 222, biasing member 230, installation lever 208) are visible. As shown, the hidden configuration 500 comprises, for each clamping assembly 104, the dog ear 210 is closer to the first end 404 of the path 402 than the second end 406. The hidden configuration 500 effectively tucks in the arms 220 of the dog ears 210, facilitating the insertion of the speaker module 101 into its mounting destination, whether it be a rough-in assembly 106 or other mounting plate, or a hole in a receiving surface or some other structure, for example.

The speaker module 101 is maintained in the hidden configuration 500 when the actuator 222 is rotated about the second axis 410 to place the body 224 of the actuator 222 in contact with a portion 502 of the dog ear 210, with a portion 504 of the actuator body 224 positioned on the path 402 between the dog ear core 212 and the second end 406, obstructing the dog ear 210 from rotating about the first axis 408 and moving along the path 402 toward the second end 406. A portion 504 of the actuator 222 being in the path 402 means that the portion 504 of the actuator 222 is occupying space that the dog ear 210 would have to pass through as it progressed along the path 402. In other words, the hidden configuration 500 will be maintained so long as the actuator 222 stays in that particular orientation. This gives the installer greater control over when the dog ears 210 are deployed than conventional triggering mechanisms. In some embodiments, the arm 220 of the dog ear 210 may be closer to the central axis 204 than the flange 400 of the driver housing 402 when the clamping assembly 104 is in the hidden configuration 500, which may further facilitate the installation process. In some embodiments, while in the hidden configuration 500, the threading, which may be spiral threading 506, may not yet be engaged.

A clamping assembly 104 may be placed in the hidden configuration 500 in preparation for installation. This may be accomplished by pushing the dog ear 210 down to the bottom of the path 402, either by pushing on the dog ear arm 220, or by pushing on the dog ear core 212 by inserting a tool through an opening 228, as discussed above. Once at the bottom of the path 402, the actuator 222 is rotated until it is blocking the dog ear 210 from being pushed back up the path 402 by the biasing element 230.

Figure 6A:
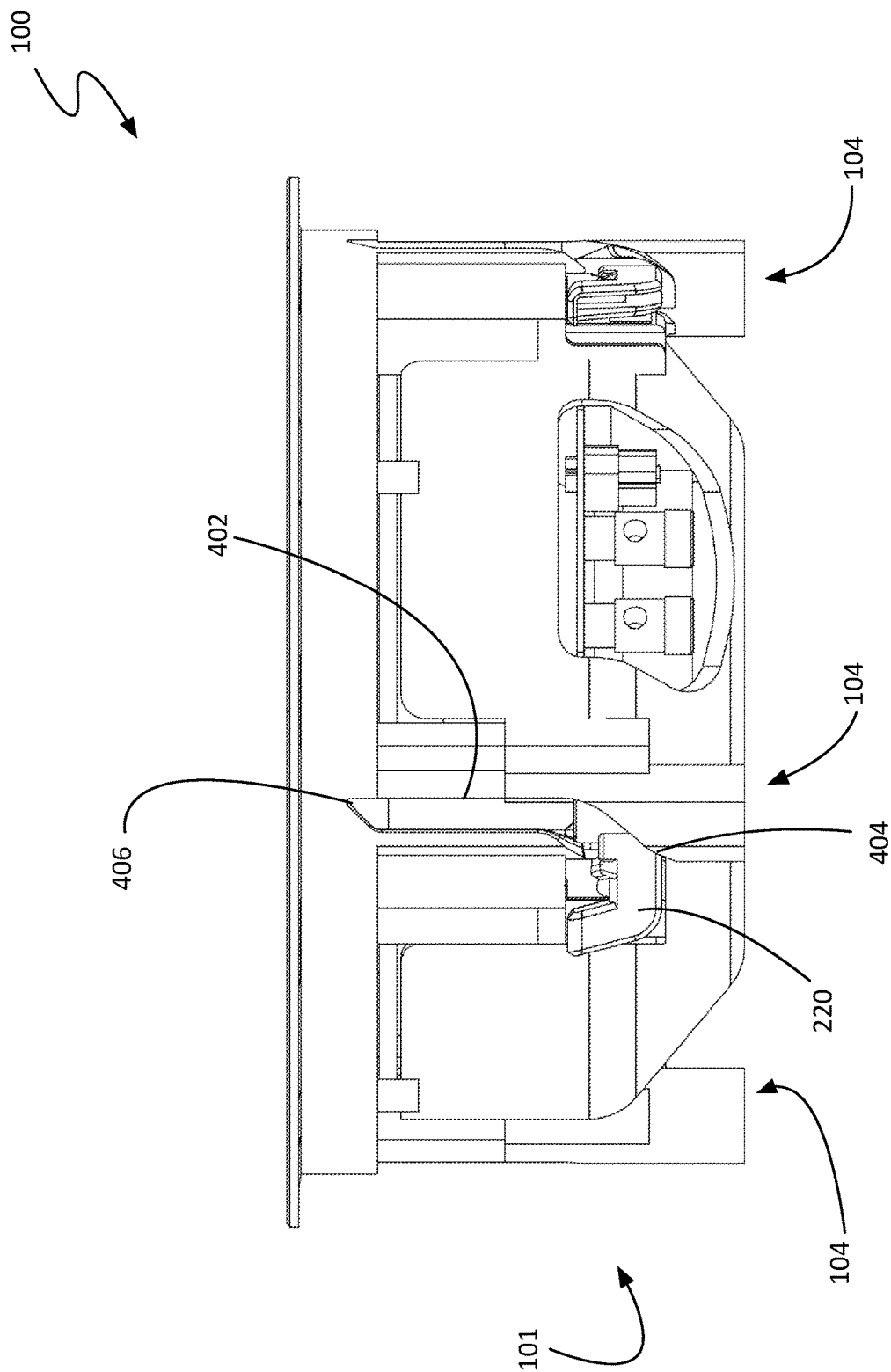
FIG. 6A is a side view of a speaker mounting system released from the hidden configuration.
Figure 6B:
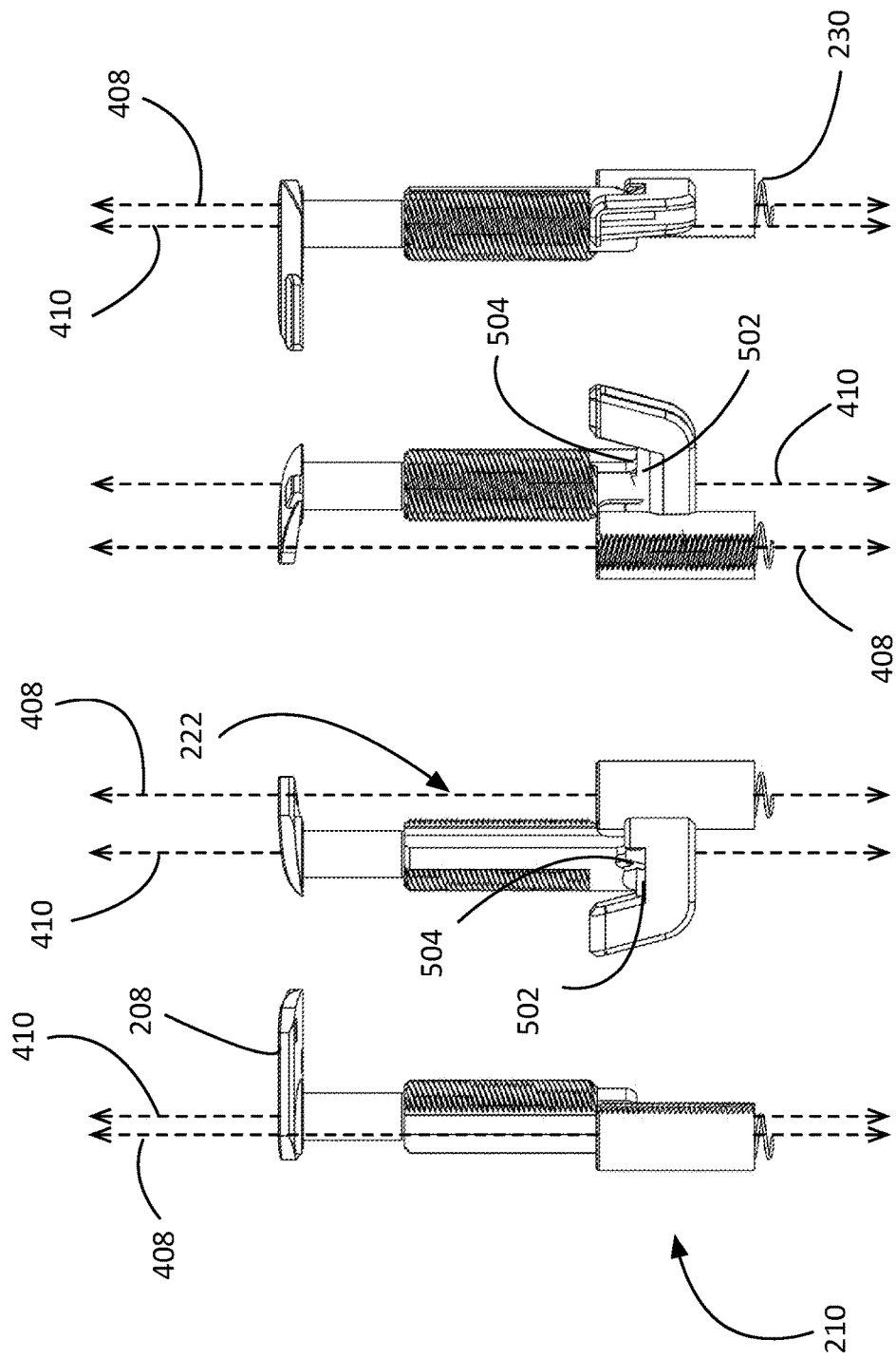
FIG. 6B is a side view of the internal members of the clamping assemblies of the speaker mounting system of FIG. 6A.

FIG. 6A is a side view of a non-limiting example of a speaker module 101 of a speaker mounting system 100 just released from the hidden configuration 500. FIG. 6B is the same view, except only the internal members (i.e. dog ear 210, actuator 222, biasing member 230, installation lever 208) are visible. As discussed above, the module 101 is released from the hidden configuration 500 when the actuator 222 is rotated about the second axis 410 enough that the portion 504 of the actuator body that was blocking the dog ear 210 is moved outside the path 402, allowing the dog ear core 212 to rotate about the first axis 408 and move along the path 402 toward the second end 406.

Figure 7A:
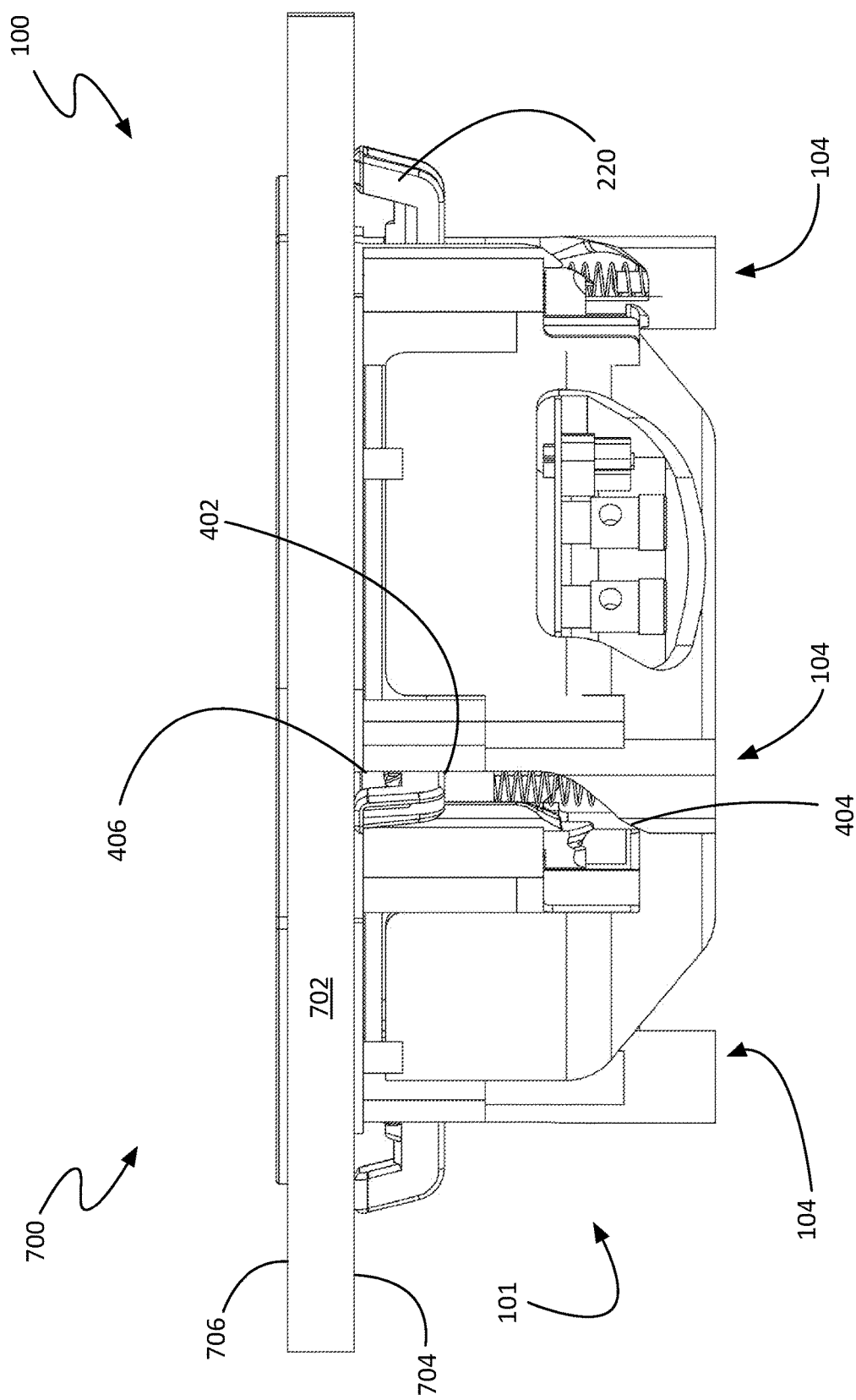
FIG. 7A is a side view of a speaker mounting system in an extended configuration.
Figure 7B:
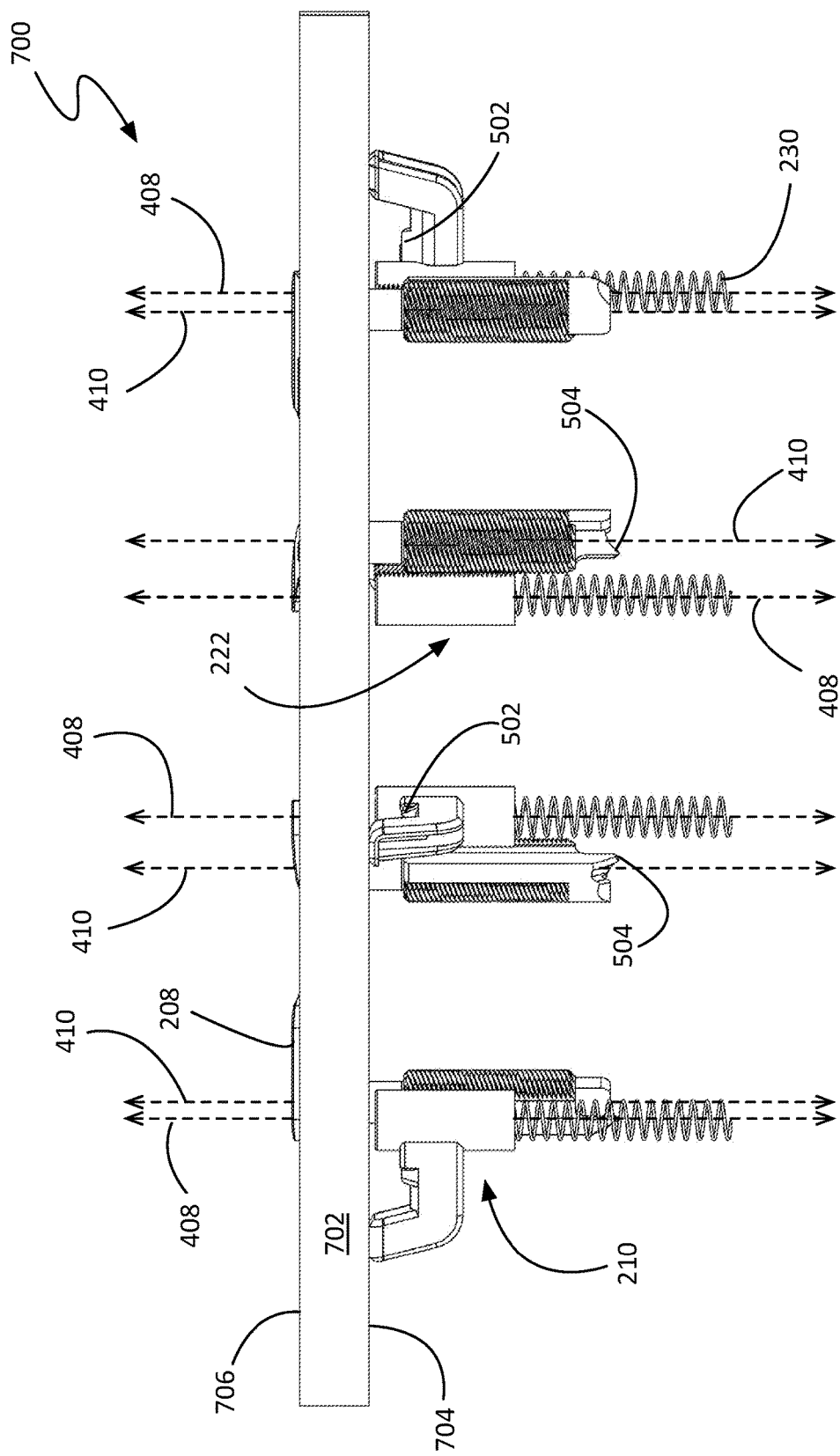
FIG. 7B is a side view of the internal members of the clamping assemblies of the speaker mounting system of FIG. 7A.

Once in the hidden configuration 500, the speaker module 101 is inserted through whatever opening it is being installed inside, so that the face 200 is on the room side of the receiving surface and a majority of each clamping assembly 104 is on the wall side of the receiving surface. After insertion, the actuator 222 is rotated (e.g. installation lever 208 is turned, etc.) until the clamping assembly 104 is released from the hidden configuration 500. Once released, the biasing element 230 will drive the dog ear 210 upward, until the assembly 104 is in the extended configuration 700, as shown in FIGS. 7A and 7B. This process is repeated for each clamping assembly 104 on the speaker module 101.

FIG. 7A is a side view of a non-limiting example of a speaker module 101 of a speaker mounting system 100 in the extended configuration 700. FIG. 7B is the same view, except only the internal members (i.e. dog ear 210, actuator 222, biasing member 230, installation lever 208) are visible. As shown, in the extended configuration 700 the biasing element 230 has driven the dog ear arm 220 upward to make contact with the receiving surface 702, but the full clamping force is not yet being exerted because the threading has not been engaged and rotated. Moving from the hidden configuration 500 to the extended configuration 700 causes the arms 220 to spin outward into an extended direction, as shown, allowing them to make contact with the receiving surface 702 they just passed through while in the hidden configuration 500.

According to various embodiments, the extended configuration 700 comprises the dog ear 210 closer to the second end 406 of the path 402 than when in the hidden configuration 500, and the arm 220 is in contact with a receiving surface 702. The receiving surface 702 may be any surface known in the art in which a speaker may be installed, including but not limited to drywall, powered rough-in assembly 106, or any other surface. Some embodiments of the speaker mounting system 100 may handle the thickness of a receiving surface 702 equivalent to a double layer of standard drywall plus the thickness of a powered rough-in assembly 106.

Figure 8A:
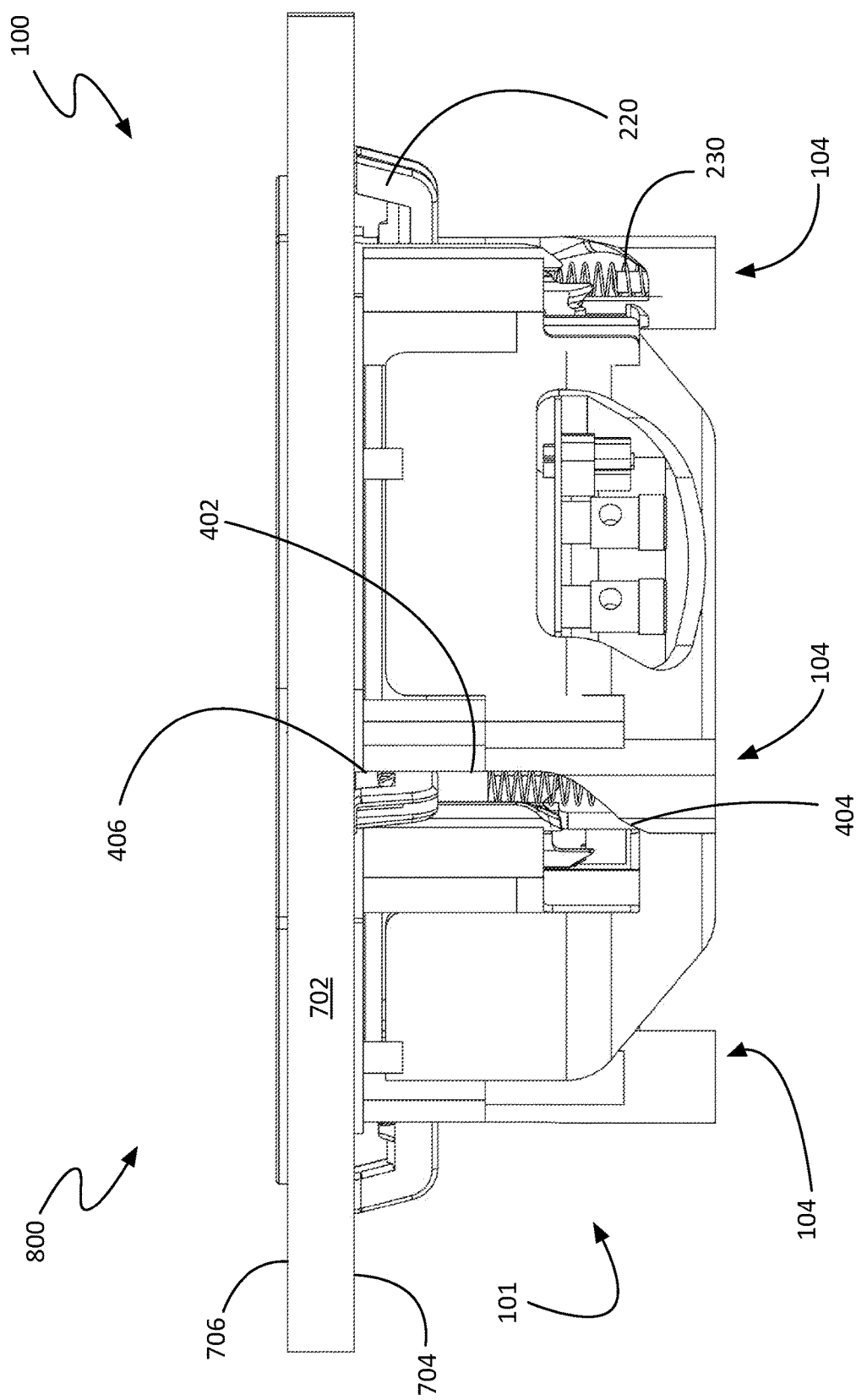
FIG. 8A is a side view of a speaker mounting system in a tightened configuration.
Figure 8B:
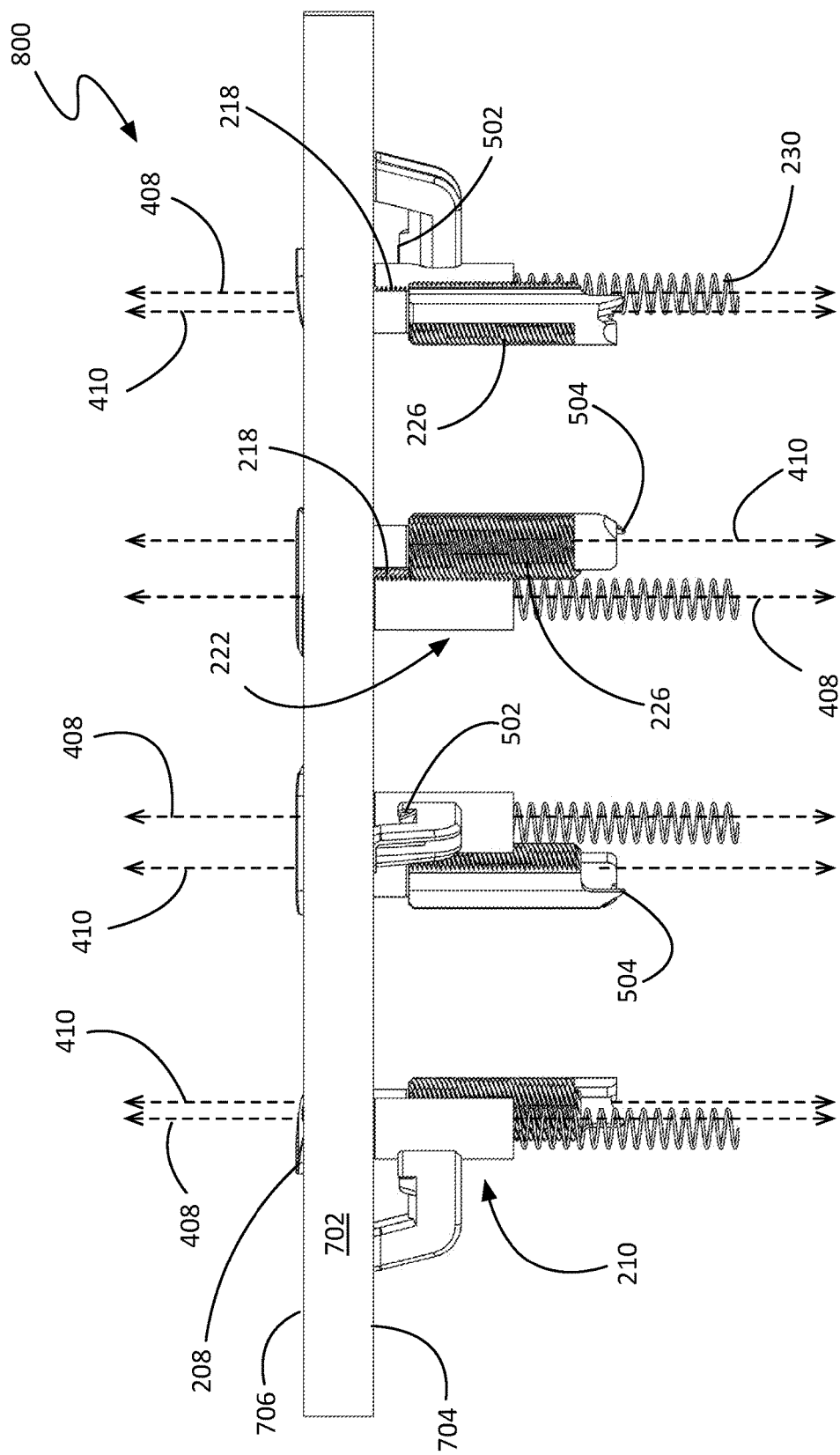
FIG. 8B is a side view of the internal members of the clamping assemblies of the speaker mounting system of FIG. 8A.

FIG. 8A is a side view of a non-limiting example of a speaker module 101 of a speaker mounting system 100 in the tightened configuration 800. FIG. 8B is the same view, except only the internal members (i.e. dog ear 210, actuator 222, biasing member 230, installation lever 208) are visible. After being placed in the extended configuration 700, subsequent turning of the actuator 222 causes the threading of the actuator 222 and dog ear 210 to engage. As shown, the threading is at an angle, such that this engagement and turning causes the dog ear 210 to be driven firmly into the receiving surface 702. The pitch of the threading may be chosen such that returning the installation levers 208 to a flush position has tightened the grip of the dog ears 210 firmly against the surface 702, without over tightening or causing damage. According to various embodiments, the tightened configuration 800 comprises the dog ear 210 closer to the second end 406 of the path 402 than when in the extended configuration 700, with the threading 218 of the core 212 engaged with the threading 226 of the actuator 222, the receiving surface 702 clamped between the arm 220 and the flange 400, as shown.

Figure 9A:
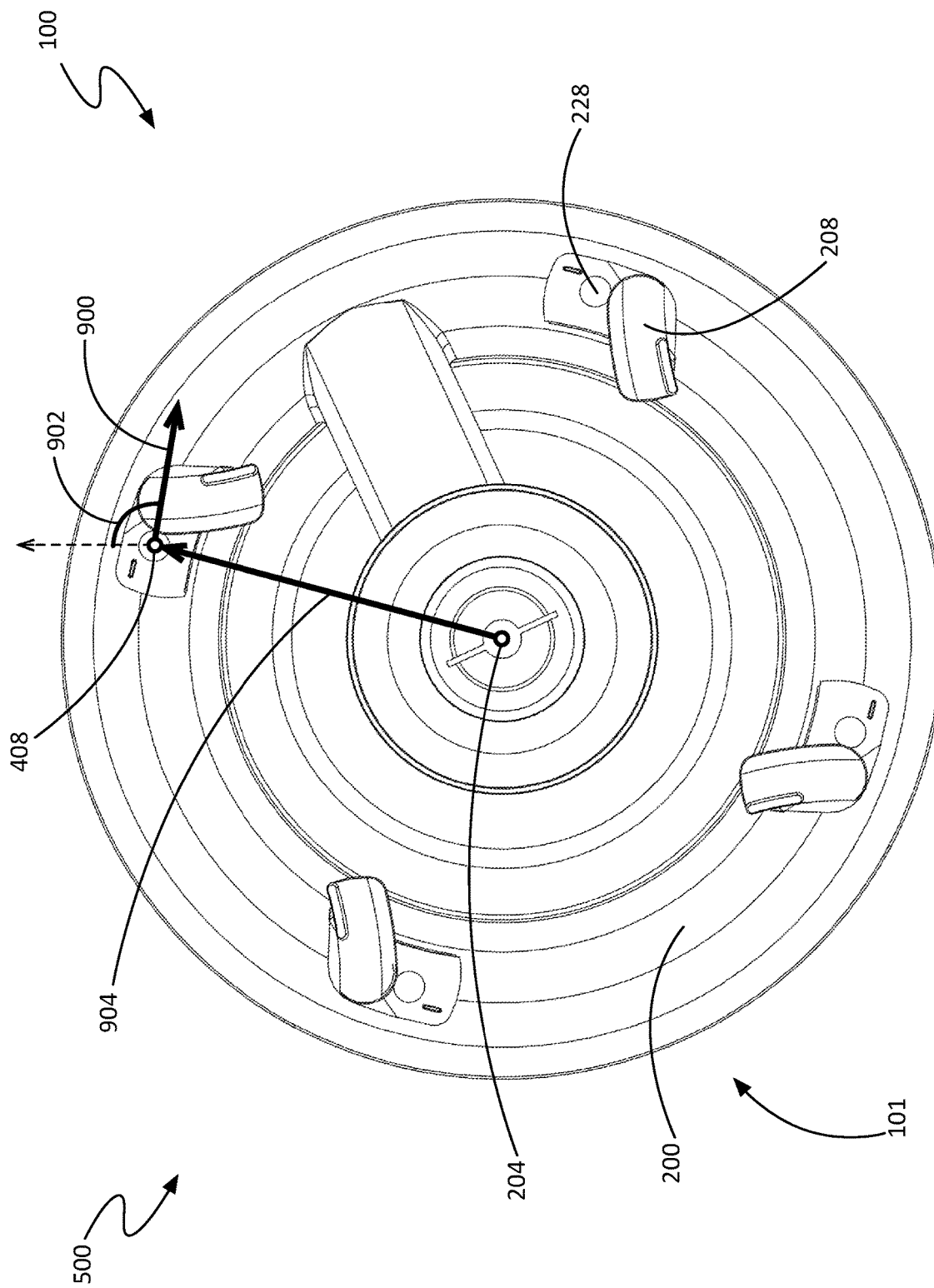
FIG. 9A is a front view of a speaker mounting system in a hidden configuration.

FIG. 9A is a front view of the speaker module 101 of a speaker mounting system 100 in a hidden configuration 500. FIG. 9B is a front view of the same module 101, but in an extended configuration 700. As shown, the hidden configuration 500 may further comprise the arm 220 extending in a hidden direction 900 that is closer to perpendicular to a line 904 between the first axis 408 and the central axis 204 than it is to being parallel. Furthermore, the extended configuration 700 may further comprise the arm 220 extending in an extended direction 906 that is closer to parallel to a line 904 between the first axis 408 and the central axis 204 than it is to being perpendicular. According to various embodiments, the orientation 902 of the arm 220 may be changed by rotating the actuator 222 when the threading is engaged, which may be accomplished by turning the installation lever 208.

The various embodiments of the speaker module 101 contemplated herein may be installed using methods known in the art, such as using traditional speaker terminals and/or rough-in mounts. In some embodiments, the speaker module 101 may be installed using a powered or wired rough-in assembly 106. A problematic aspect of using conventional rough-in mounts is that the speaker wire is left hanging out of the mount, or somewhere inside the wall, where it can be tangled, damaged, or lost during the trim-out phase. Contemplated herein is a powered rough-in assembly 106 that can be installed during new construction or when joists, studs, or other structures are exposed, and then wired directly into a sound system using terminals. The rough-in assembly 106 then provides a short "pig tail" that can be easily connected to a speaker, be it the speaker module 101 contemplated herein, or some other speaker module 1400. Terminating the speaker wires into the rough-in assembly 106 during the rough-in phase, and then wiring the speaker into the rough-in assembly 106 after the trim-out phase, makes the installation and removal of the speaker modules much easier, and the quality higher and more consistent.

Figure 10:
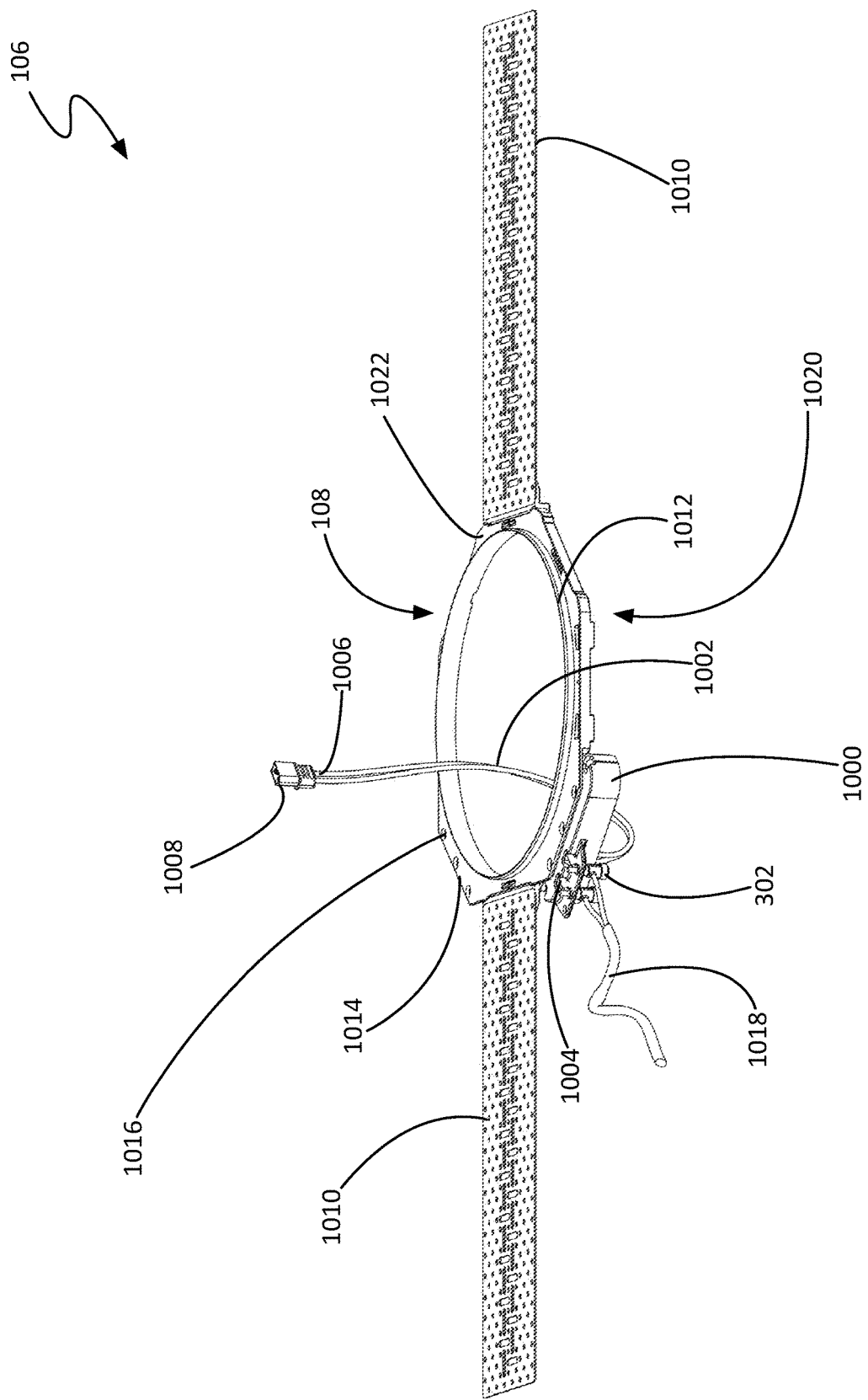
FIG. 10 is a front perspective view of a powered rough-in assembly.
Figure 11:
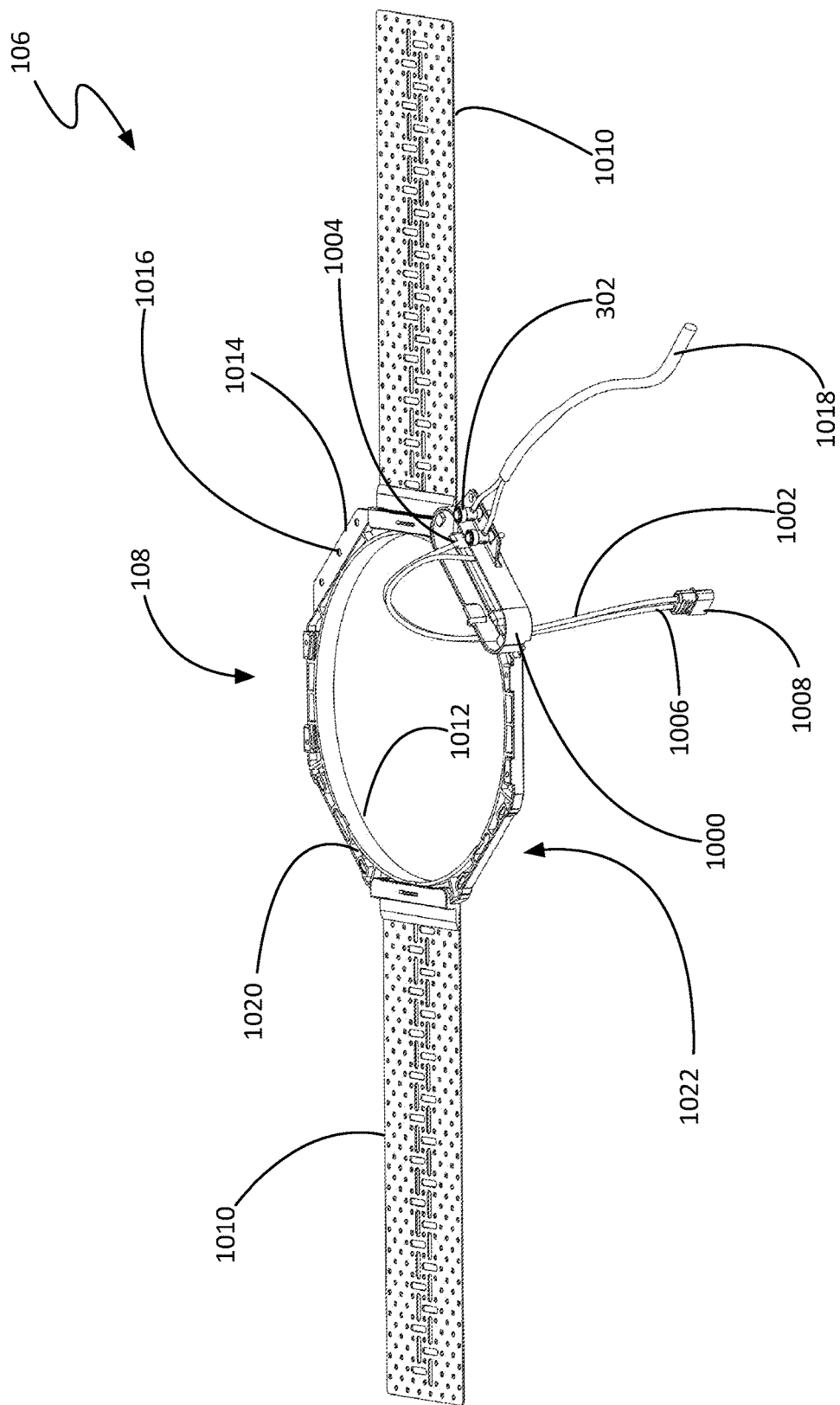
FIG. 11 is a rear perspective view of a powered rough-in assembly.
Figure 12:
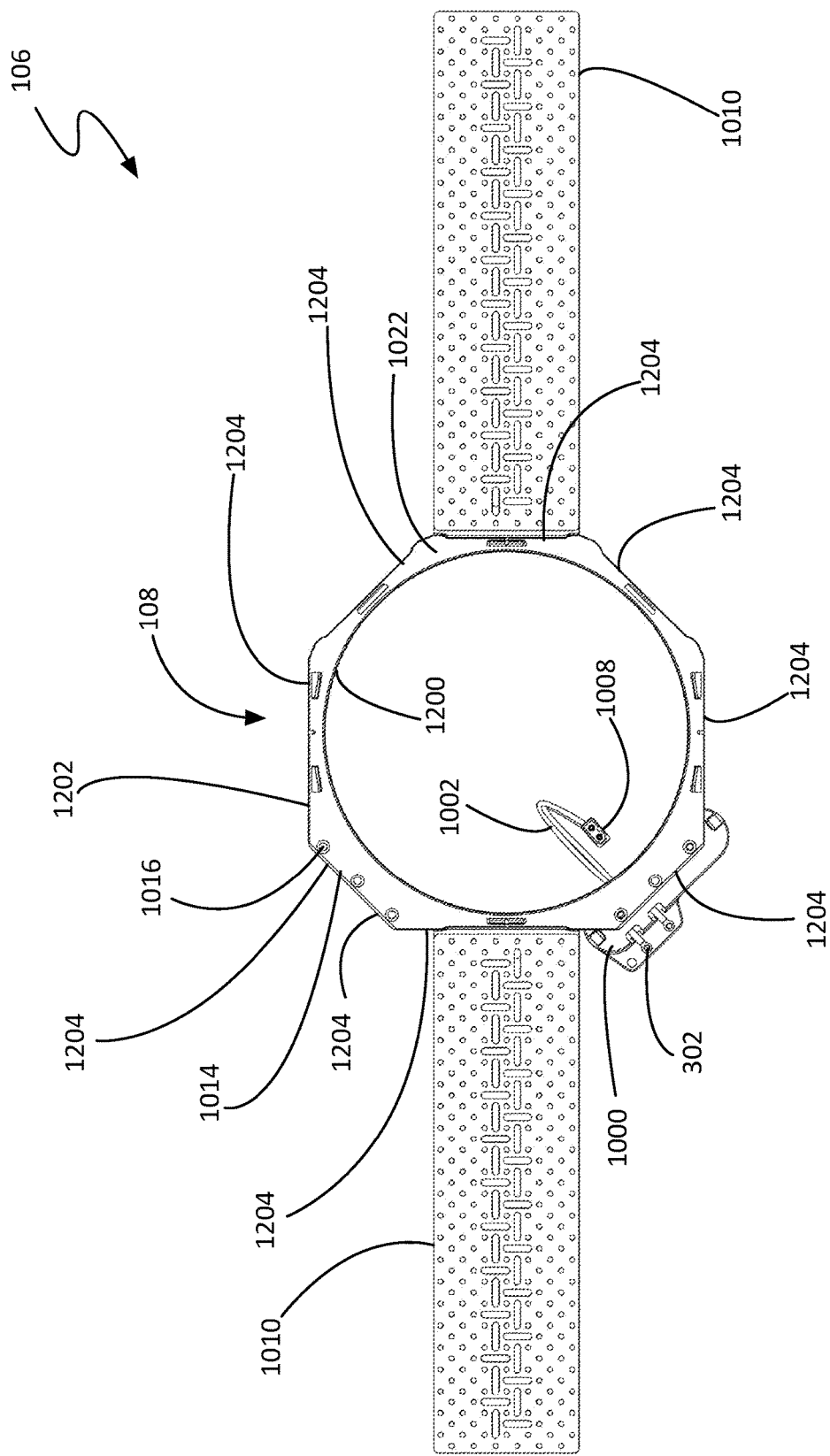
FIG. 12 is a front view of a powered rough-in assembly.
Figure 13:
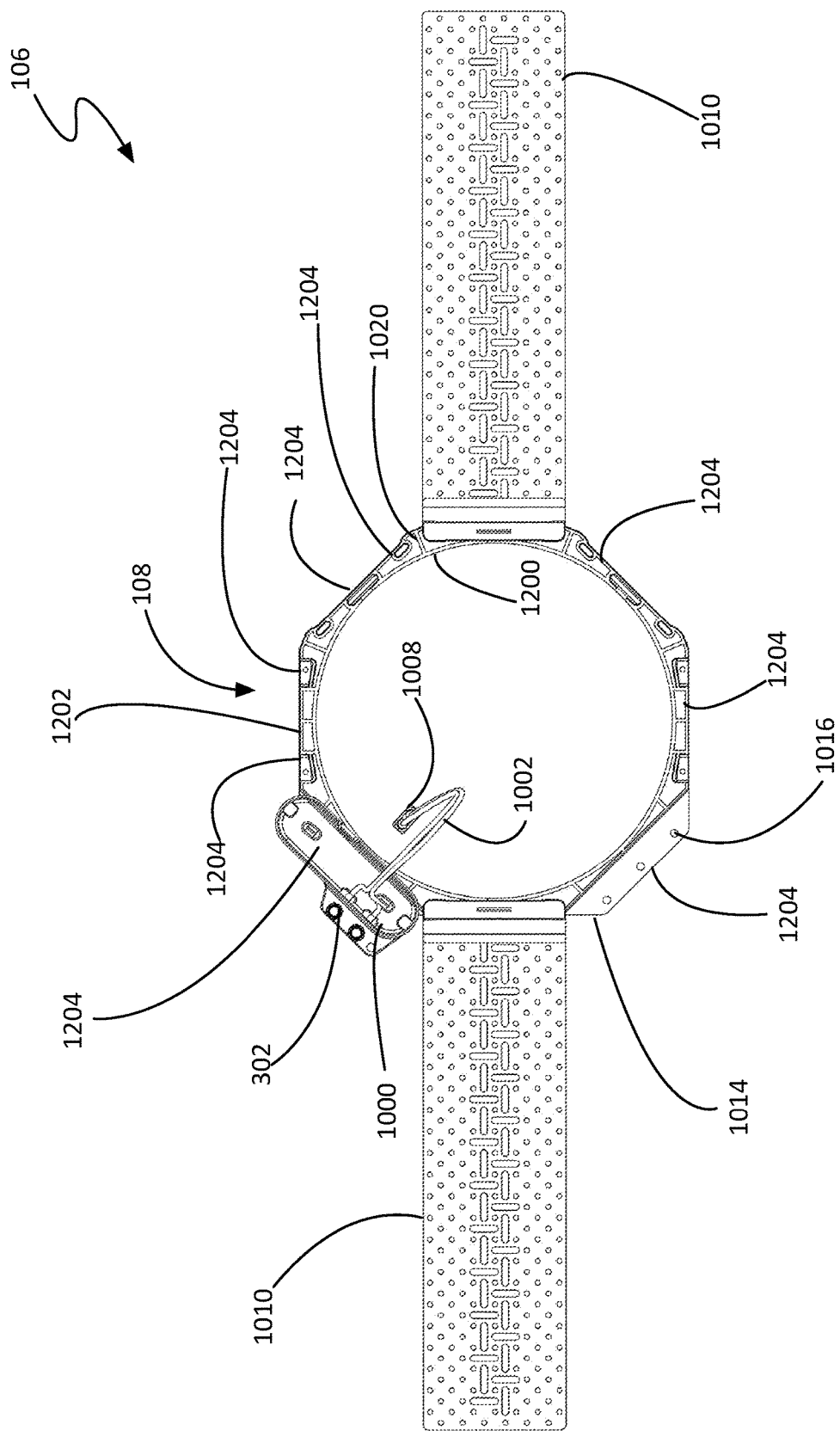
FIG. 13 is a rear view of a powered rough-in assembly.

FIGS. 10-13 are various views of a non-limiting example of a powered rough-in assembly 106. Specifically, FIG. 10 is a front perspective view, FIG. 11 is a rear perspective view, FIG. 12 is a front view (i.e. looking at the room side 1022), and FIG. 13 is a rear view (i.e. looking at the wall side 1020). As shown, the powered rough-in assembly 106 comprises a mounting frame 108 that is annular and has two wire terminals 302. In the context of the present description and the claims that follow, an annular mounting frame 108 has an inner perimeter 1200 defining an aperture through which a speaker module 101 is inserted for mounting, and an outer perimeter 1202 defining an outer shape of the frame 108. As shown, in some embodiments, the inner perimeter 1200 may be circular; those skilled in the art will recognize that the inner perimeter 1200 may be sized and shaped to receive any speaker module 101 known in the art.

The shape of the outer perimeter 1202 can influence the ways the powered rough-in assembly 106 may be coupled to a stud or other structure. In some embodiments, the outer perimeter 1202 may be polygonal, having a plurality of edges 1204. In some embodiments, the powered rough-in assembly 106 may have eight edges 1204, such as the non-limiting embodiment shown in FIGS. 10-13. Other embodiments may have other numbers of edges 1204, from four, five, six, or more.

According to various embodiments, the edges 1204 may be configured to facilitate the coupling of the powered rough-in assembly 106 to a joist, stud, or other structure. For example, in some embodiments, one or more edges 1204 may be releasably coupled to a wing 1010. In the context of the present description and the claims that follow, a wing 1010 is a flat structure that can couple to an edge 1204 of the frame 108, and through which fasteners (e.g. nails, screws, etc.) may be driven, pinning it to some other structure such as studs, joists, etc., as is known in the art. Some wings 1010 may be metal, while others may be plastic, or other durable materials. In some embodiments, the wing 1010 may have a plurality of openings that can receive the fasteners. As an option, the wing 1010 may be fixedly coupled to an edge 1204 in some embodiments, while in other embodiments the coupling may be releasable.

In some embodiments, one or more edges 1204 of the frame 108 may be flanges 1014, meaning a thinner surface than the rest of the frame 108, and through which fasteners may be driven. In some embodiments, the flange 1014 may have a plurality of holes 1016 for said fasteners. As an option, the holes 1016 may be counter sunk.

After being coupled to a stud or other structure(s) during rough-in, the wire terminals 302 may be coupled to a cable 1018 communicatively coupled to a sound system or other source, terminating the cable at the rough-in assembly 106. During trim-out, the drywall or other finishing material is placed over the powered rough-in assembly 106, with an aperture cut sized to expose the inner perimeter of the frame 108. In some embodiments, the frame 108 may comprise a lip 1012 that extends outward from the room side of the frame 108, that better defines a smooth aperture to receive the speaker module after trim-out, painting, and the like.

In some embodiments, the wire terminals 302 may be installed directly on the frame 108. In other embodiments, including the non-limiting example shown in FIGS. 10-14, the electrical connections may occur on a wire block 1000 that is coupled to the frame 108. For example, in some embodiments, the wiring block 1000 is coupled to an edge 1204. As a specific example, in one embodiment, the wiring block 1000 is coupled to a flange 1014 via fasteners passing through holes 1016 in the flange 1014. In other embodiments, the wiring block 1000 may be coupled to the frame 108 on the wall side, or another location that does not interfere with the eventual installation of drywall or other finishing material. The use of a wiring block 1000 may be advantageous, as the same bare frame 108 could be used with different wiring blocks 1000, each configured for a particular type of connection with a speaker module 101 (e.g. plug, bare wire, etc.).

As shown, the wiring block 1000 may comprise the wire terminals 302, each of which is also coupled to a wire 1002 meant to be coupled to the speaker module 101. In some embodiments, these wires 1002 may be fastened to the terminals 302 during manufacture, meaning they are present during installation of the rough-in assembly 106, while in other embodiments, the wires 1002 may be coupled to the powered rough-in assembly 106 after trim-out (e.g. a plug interface coupled to the terminals on the wiring block 1000 would facilitate the coupling of the wires after trim-out while avoiding hanging wires before installation of the speaker module 101, etc.). The terminals 302 may be spring-type terminals, or any other type of terminal known in the art.

According to various embodiments, the first end 1004 of each wire 1002 is coupled to a terminal 302 on the powered rough-in assembly 106. Said coupling may be fixed (e.g. soldered, screwed, etc.), or may be releasable. In some embodiments, the second end 1006 of the wires 1002 may be bare wire, ready for reception into a traditional wire terminal 302 on the speaker module 1400. In other embodiments, the second end 1006 of both wires 1002 may be coupled to a plug 1008. In the context of the present description and the claims that follow, a plug 1008 and a plug receiver 300 are uniform structures that mate together forming an electrical connection(s) that is consistent and easily repeatable. It should be noted that when referring to plugs 1008 and plug receivers 300, there is no restricting being made on which is male-type and which is female-type, if either are any type at all.

Figure 14:
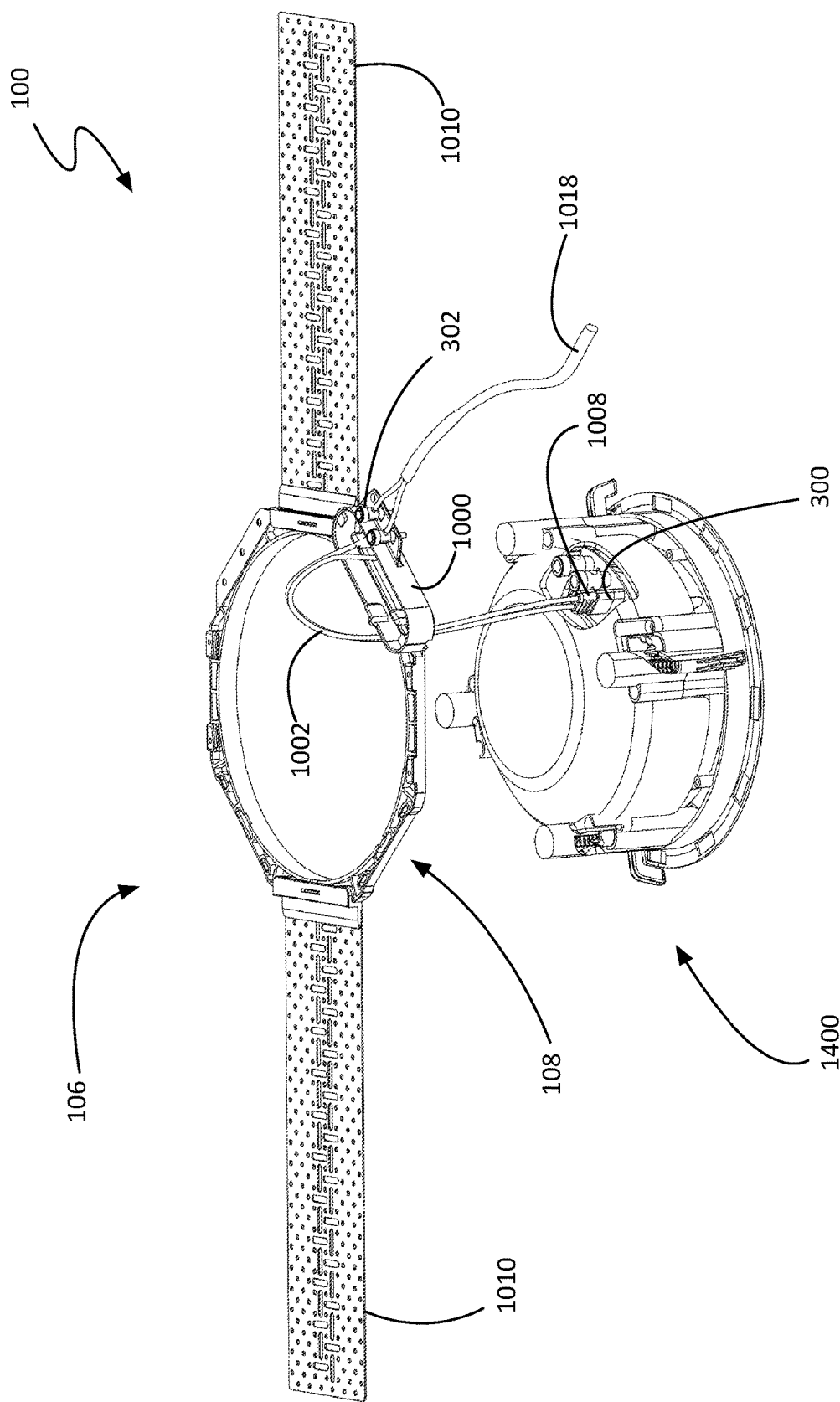
FIG. 14 is a rear perspective view of a speaker mounting system with a powered rough-in assembly.

FIG. 14 shows a rear perspective view of a non-limiting example of a speaker mounting system 100 comprising a powered rough-in assembly 106 and a speaker module 1400. In some embodiments, speaker module 1400 may be speaker module 101, discussed above, while in other embodiments, it may be a conventional speaker module.

As shown, installation of the speaker module 1400 in the rough-in assembly 106 occurs after trim-out, and begins with communicatively coupling the speaker module 1400 to the powered rough-in assembly 106 using the wires 1002, whether their second ends 1006 are bare, coupled to a plug, or otherwise structured. After the speaker module 1400 is connected, it may be inserted through the aperture defined by the inner perimeter 1200, and whatever installation process appropriate for that speaker module 1400 may be followed.

Where the above examples, embodiments and implementations reference examples, it should be understood by those of ordinary skill in the art that other speaker mounting systems, clamping assemblies, drivers, and rough-in assemblies could be intermixed or substituted with those provided. In places where the description above refers to particular embodiments of speaker mounting systems and methods, it should be readily apparent that a number of modifications may be made without departing from the spirit thereof and that these embodiments and implementations may be applied to other to speaker mounting systems and methods as well. Accordingly, the disclosed subject matter is intended to embrace all such alterations, modifications and variations that fall within the spirit and scope of the disclosure and the knowledge of one of ordinary skill in the art.

What is claimed is:

1. A speaker mounting system, comprising:
   a driver housing comprising a face surrounded by a flange, a driver, two wire terminals, a plug receiver, and a central axis, wherein the two wire terminals and the plug receiver are communicatively coupled to the driver;
   a plurality of clamping assemblies coupled to the driver housing, each clamping assembly comprising:

an enclosure;
a dog ear comprising a core with a front end and a rear end distal to the front end, the dog ear further comprising a threading and an arm extending outward from the core, the dog ear rotatably coupled to the enclosure along a first axis of the clamping assembly passing through the front and rear ends, and slideable along a path, the path having a first end and a second end, the second end distal to the first end and closer to the face than the first end, the path further defining the orientation of the arm with respect to the first axis;
an actuator comprising a body and a threading, the actuator rotatably coupled to the enclosure along a second axis parallel to and separate from the first axis;
an installation lever coupled to the actuator through the second axis and shaped to sit flush with the face of the driver housing; and
a biasing element coupled to the rear end of the core of the dog ear and the enclosure, the biasing element biasing the dog ear towards the face of the driver housing;
wherein each clamping assembly is movable between a hidden configuration, an extended configuration, and a tightened configuration;
wherein the hidden configuration comprises the dog ear closer to the first end of the path than the second end, the arm extending in a hidden direction that is closer to perpendicular to a line between the first axis and the central axis than parallel;
wherein the extended configuration comprises the dog ear closer to the second end of the path than when in the hidden configuration, the arm extending in an extended direction that is closer to parallel to the line between the first axis and the central axis than perpendicular, the arm in contact with a receiving surface;
wherein the tightened configuration comprises the dog ear closer to the second end of the path than when in the extended configuration, the threading of the core engaged with the threading of the actuator, the receiving surface clamped between the arm and the flange;
wherein, for each clamping assembly of the plurality of clamping assemblies, the clamping assembly is maintained in the hidden configuration when the actuator is rotated about the second axis to place the body of the actuator in contact with a portion of the dog ear, with a portion of the actuator body positioned on the path between the dog ear core and the second end, obstructing the dog ear from rotating about the first axis and moving along the path toward the second end;
wherein, for each clamping assembly of the plurality of clamping assemblies, the clamping assembly is driven from the hidden configuration to the extended configuration by the biasing element when the actuator is rotated, placing the portion of the actuator body outside the path and allowing the dog ear core to rotate about the first axis and move along the path toward the second end;
wherein each clamping assembly is driven from the extended configuration to the tightened configuration by the rotation of the actuator via the installation lever while the threading of the actuator is engaged with the threading of the dog ear core; and
wherein the driver housing and the plurality of clamping assemblies makes up a speaker module.

2. The speaker mounting system of claim 1 wherein, for each clamping assembly, the installation lever is fixedly coupled to the actuator body.

3. The speaker mounting system of claim 1 wherein, for each clamping assembly, the installation lever is releasably coupled to the actuator body.

4. The speaker mounting system of claim 1 wherein, for each clamping assembly, the threading of the dog ear core is a spiral threading, spiraling along the first axis.

5. The speaker mounting system of claim 1, further comprising:
a powered rough-in assembly comprising:
a mounting frame that is annular, comprising an inner perimeter sized and shaped to receive the speaker module, and an outer perimeter having a polygonal shape with a plurality of edges; and
a wiring block coupled to a first edge of the plurality of edges of the mounting frame, the wiring block comprising two spring-type terminals and two wires, each terminal communicatively coupled to a first end of a different wire of the two wires;
wherein the plurality of edges comprises at least one edge that is a flange comprising a plurality of countersunk holes;
wherein the plurality of edges comprises at least two edges releasably coupled to metal wings;
wherein the second ends of the two wires are coupled to a plug mated with the plug receiver of the driver housing, communicatively coupling the driver with the terminals of the rough-in assembly.

6. A speaker mounting system, comprising:
a driver housing comprising a face surrounded by a flange, a driver and a central axis;
a plurality of clamping assemblies coupled to the driver housing, each clamping assembly comprising:
an enclosure;
a dog ear comprising a core with a front end and a rear end distal to the front end, the dog ear further comprising a threading and an arm extending outward from the core, the dog ear rotatably coupled to the enclosure along a first axis of the clamping assembly passing through the front and rear ends, and slideable along a path, the path having a first end and a second end, the second end distal to the first end and closer to the face than the first end, the path further defining the orientation of the arm with respect to the first axis;
an actuator comprising a body and a threading, the actuator rotatably coupled to the enclosure along a second axis; and
a biasing element coupled to the rear end of the core of the dog ear and the enclosure, the biasing element biasing the dog ear towards the face of the driver housing;
wherein each clamping assembly is movable between a hidden configuration, an extended configuration, and a tightened configuration;
wherein the hidden configuration comprises the dog ear closer to the first end of the path than the second end, the arm extending in a hidden direction that is closer to perpendicular to a line between the first axis and the central axis than parallel;
wherein the extended configuration comprises the dog ear closer to the second end of the path than when in the hidden configuration, the arm extending in an extended direction that is closer to parallel to the line between the first axis and the central axis than perpendicular, the arm in contact with a receiving surface;

wherein the tightened configuration comprises the dog ear closer to the second end of the path than when in the extended configuration, the threading of the core engaged with the threading of the actuator, the receiving surface clamped between the arm and the flange;

wherein, for each clamping assembly of the plurality of clamping assemblies, the clamping assembly is maintained in the hidden configuration when the actuator is rotated about the second axis to place the body of the actuator in contact with a portion of the dog ear, with a portion of the actuator body positioned on the path between the dog ear core and the second end, obstructing the dog ear from rotating about the first axis and moving along the path toward the second end;

wherein, for each clamping assembly of the plurality of clamping assemblies, the clamping assembly is driven from the hidden configuration to the extended configuration by the biasing element when the actuator is rotated, placing the portion of the actuator body outside the path and allowing the dog ear core to rotate about the first axis and move along the path toward the second end;

wherein each clamping assembly is driven from the extended configuration to the tightened configuration by the rotation of the actuator while the threading of the actuator is engaged with the threading of the dog ear core; and wherein the driver housing and the plurality of clamping assemblies makes up a speaker module.

7. The speaker mounting system of claim 6 wherein, for each clamping assembly, the arm of the dog ear is closer to the central axis than the flange of the driver housing when the clamping assembly is in the hidden configuration.

8. The speaker mounting system of claim 6, wherein each clamping assembly of the plurality of clamping assemblies further comprises an installation lever coupled to the actuator through the second axis and shaped to sit flush with the face of the driver housing.

9. The speaker mounting system of claim 8 wherein, for each clamping assembly, the installation lever is fixedly coupled to the actuator body.

10. The speaker mounting system of claim 8 wherein, for each clamping assembly, the installation lever is releasably coupled to the actuator body.

11. The speaker mounting system of claim 8 wherein, for each clamping assembly, the installation lever covers an opening providing access to the dog ear.

12. The speaker mounting system of claim 6 wherein, for each clamping assembly, the arm of the dog ear has a grip.

13. The speaker mounting system of claim 6, wherein the second axis is parallel to and separate from the first axis.

14. The speaker mounting system of claim 6, the driver housing further comprising the driver communicatively coupled to at least one of a plug receiver and two wire terminals.

15. The speaker mounting system of claim 6 wherein, for each clamping assembly, the threading of the dog ear core is a spiral threading, spiraling along the first axis.

16. The speaker mounting system of claim 6, further comprising:
a powered rough-in assembly comprising two wire terminals, two wires, and a mounting frame that is annular, the mounting frame comprising an inner perimeter sized and shaped to receive the speaker module, and an outer perimeter;

wherein each terminal of the powered rough-in assembly is communicatively coupled to the driver of the driver housing.

17. A method for installing a speaker mounting system, comprising:
preparing the speaker mounting system for installation, the speaker mounting system comprising a speaker module having a plurality of clamping assemblies and a driver housing having a central axis, the face surrounded by a flange, wherein said preparing for installation comprising placing each clamping assembly in a hidden configuration, wherein each clamping assembly of the plurality of clamping assemblies comprises:
an enclosure,
a dog ear comprising a core with a front end and a rear end distal to the front end, the dog ear further comprising a threading and an arm extending outward from the core, the dog ear rotatably coupled to the enclosure along a first axis of the clamping assembly passing through the front and rear ends, and slideable along a path, the path having a first end and a second end, the second end distal to the first end and closer to the face of the driver housing than the first end, the path further defining the orientation of the arm with respect to the first axis,
an actuator comprising a body and a threading, the actuator rotatably coupled to the enclosure along a second axis, and
a biasing element coupled to the rear end of the core of the dog ear and the enclosure, the biasing element biasing the dog ear towards the face of the driver housing,
wherein the hidden configuration comprises the dog ear closer to the first end of the path than the second end, the arm extending in a hidden direction that is closer to perpendicular to a line between the first axis and the central axis than parallel;
inserting the speaker mounting system through an opening in a receiving surface such that the face of the driver housing is on a room side of the receiving surface and a majority of each clamping assembly is on a wall side of the receiving surface opposite the room side;
releasing, for each clamping assembly of the plurality of clamping assemblies, the clamping assembly from the hidden configuration, allowing the biasing element to drive the clamping assembly to an extended configuration, the extended configuration comprising the dog ear closer to the second end of the path than when in the hidden configuration, the arm extending in an extended direction that is closer to parallel to the line between the first axis and the central axis than perpendicular, and the arm in contact with the wall side of the receiving surface; and
driving, for reach clamping assembly of the plurality of clamping assemblies, the clamping assembly from the extended configuration to a tightened configuration by rotating the actuator while the threading of the actuator is engaged with the threading of the dog ear core, the tightened configuration comprising the dog ear closer to the second end of the path than when in the extended configuration, the threading of the core engaged with the threading of the actuator, and the receiving surface clamped between the arm and the flange.

18. The method of claim 17, wherein placing each clamping assembly of the plurality of clamping assemblies in the hidden configuration comprises:

moving the dog ear core to the first end of the path while compressing the biasing element; and rotating the actuator about the second axis to place the body of the actuator in contact with a portion of the dog ear, and place a portion of the actuator body on the path between the dog ear core and the second end, obstructing the dog ear from rotating about the first axis and moving to the extended configuration.

19. The method of claim 17, wherein releasing each clamping assembly of the plurality of clamping assemblies from the hidden configuration comprises rotating the actuator about the second axis to place the portion of the actuator body outside the path, allowing the dog ear core to rotate about the first axis and be driven along the path toward the second end by the biasing element.

20. The method of claim 17, further comprising:

coupling a powered rough-in assembly to at least one joist before installation of the receiving surface, the powered rough-in assembly comprising two wire terminals, two wires, and a mounting frame that is annular, the mounting frame comprising an inner perimeter sized and shaped to receive the speaker module, and an outer perimeter, wherein each terminal is coupled to a first end of a different wire of the two wires, and the second ends of the two wires is coupled to a plug;

communicatively coupling the powered rough-in assembly to a sound system wiring installed before installation of the receiving surface; and communicatively coupling the speaker mounting system to the sound system wiring after installation of the receiving surface and before inserting the speaker mounting system through the opening in the receiving surface by mating the plug of the powered rough-in assembly with a plug receiver of the driver housing;

wherein the tightened configuration further comprises clamping the receiving surface and a portion of the mounting frame of the powered rough-in assembly between the arm and the flange.

* * * * *